(12) United States Patent
Kawakami et al.

(10) Patent No.: US 7,126,587 B2
(45) Date of Patent: Oct. 24, 2006

(54) INFORMATION PROCESSING METHOD, INFORMATION PROCESSING DEVICE, IMAGE OUTPUT DEVICE, INFORMATION PROCESSING PROGRAM, AND RECORDING MEDIUM

(75) Inventors: Masaaki Kawakami, Yamatokoriyama (JP); Hirotsugu Kubo, Yoshino-gun (JP); Masaki Shiozaki, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/087,853

(22) Filed: Mar. 24, 2005

(65) Prior Publication Data

US 2005/0225540 A1    Oct. 13, 2005

(30) Foreign Application Priority Data

Mar. 26, 2004  (JP)  .............. 2004-093193

(51) Int. Cl.
*G09G 5/00*  (2006.01)
(52) U.S. Cl. ...................... 345/168; 345/173
(58) Field of Classification Search ................ 345/156, 345/168, 173; 715/773
See application file for complete search history.

(56) References Cited

U.S. PATENT DOCUMENTS

2004/0130573 A1*  7/2004  Konuma et al. ............ 345/764

2005/0129199 A1*  6/2005  Abe ........................ 379/90.01
2005/0227762 A1*  10/2005  Tahara et al. ................ 463/30
2005/0248525 A1*  11/2005  Asai .......................... 345/156
2005/0259087 A1*  11/2005  Hoshino et al. ............. 345/173

FOREIGN PATENT DOCUMENTS

| JP | 11-3440 | 1/1999 |
| JP | 2000-253288 | 9/2000 |
| JP | 2002-351618 | 12/2002 |
| JP | 2003-280782 | 10/2003 |
| JP | 2004-78678 | 3/2004 |

* cited by examiner

*Primary Examiner*—Ricardo Osorio
(74) *Attorney, Agent, or Firm*—Birch, Stewart, Kolasch & Birch, LLP

(57) ABSTRACT

In case where a key having a detection region (inner frame) in which user's instructions can be accepted is displayed according to a certain operation status of an apparatus, and in case where there is an invalid region in which the user's instruction is not detectable is adjacent to a key display region (outer frame) of the key, the detection region of the key is caused to be larger than the key display region by utilizing the invalid region. Moreover, the detection region is expanded/shrunk according to key arrangement and a number of keys to be displayed. With this, the detection region of the key is expanded/shrunk according to according to the key arrangement on the screen in a display-cum-operation device in which a display device and a coordinate input device are integrated.

20 Claims, 13 Drawing Sheets

INFORMATION PROCESSING METHOD, INFORMATION PROCESSING DEVICE, IMAGE OUTPUT DEVICE, INFORMATION PROCESSING PROGRAM, AND RECORDING MEDIUM

This Nonprovisional application claims priority under 35 U.S.C. § 119(a) on Patent Application No. 2004/93193 filed in Japan on Mar. 26, 2004, the entire contents of which are hereby incorporated by reference.

FIELD OF THE INVENTION

The present invention relates to an information processing device which identifies a user's instruction by (i) display positions where keys (buttons, icons, or the like for user entry are displayed on a screen associated with the information processing device and (ii) a detection result of a position of the key selected by the user; more particularly, relates to an information processing device applicable to an display operation device, such as a display touch panel (i.e. a touch panel integrated with a display device), including a display screen, such as an LCD, and a touch panel superimposed thereon.

BACKGROUND OF THE INVENTION

In recent years, various information processing devices have been provided with a display section, such as an LCD (Liquid Crystal Displays), for displaying its operation status and processing information. As the display section, a display touch panel having a display screen, such as LCD, and a touch panel placed thereon is adopted in many cases. Such a display touch panel displays keys (buttons, icons, or the like) for accepting user's instructions on a display screen, detects a position in the display screen where the user touches (contacting instruction) or a position in the display screen to which the user locally brings his/her finger or the like closer (locally approaching) (non-contacting instruction), and find out which key for inputting instruction is used by the user on the basis of the position thus detected and a display position of the key.

The above-described keys provided on the display screen are sometimes called "soft keys", as distinguished from keys as hardware provided on a keyboard. However, in the present application, the above-described keys are simply called "keys".

For example, in the case of a multiple function printer (MFP) having a plurality of functions as copying machine, printer, scanner, and others and a function of communicating with other information processing device, a display screen for selection of copy styles based on a single-sided printing document and a double-sided printing document in copy mode shows the following four keys: "1-sided original, 1-sided copy", "1-sided original, 2-sided copy", "2-sided original, 2-sided copy", and "2-sided original, 1-sided copy". In addition, the display screen shows, for settings of trays holding recording sheets of different sizes, keys for selection of types of recording sheets (white papers, colored papers, OHP sheets, and others) and keys for selection of sheet sizes including "B5", "A4", "B4", and "A3" sizes.

All of the keys are provided at fixed positions on the display screen. In many cases, keys available for a used operation are displayed in a normal state, but keys unavailable (invalid) for that operation are not displayed at all or displayed with low contrast to distinguish from the available (valid) keys. For example, if the multiple function printer does not have, as an option, a paper reversing device for double-sided printing, the two keys "1-sided original, 2-sided copy" and "2-sided original, 2-sided copy" out of the above four keys becomes unavailable (invalid) and are displayed in a different manner from the other available (valid) keys. Such a display style is adopted in various devices, not limited to the multiple function printer.

Meanwhile, on a facsimile and/or e-mail destination selection screen, the number of keys to be displayed varies according to the number of destinations being registered. For this selection screen, often adopted display style is a display style such that the keys are placed in a given pattern of locations in the display screen regardless of the number of keys. An example of such a display style is as follows: the keys are placed beginning at the top of the display screen, and if the keys are too much in number to be displayed on one screen, a scroll is showed up in the screen.

When such keys are displayed in large numbers on the display screen, different keys placed closer to one another increase the possibility that the touch panel could misidentify user's selection. This occurs not only because on a contacting-type touch panel, for example, the user tends to mistakenly touch a key, but also because the user's finger tends to touch two adjacent keys.

As the invention for preventing misidentification of the touch panel, patent document 1 (Japanese Laid-Open Patent Application No. 1999/003440 (Tokukaihei 11-003440; published on Jan. 6, 1999)) discloses a touch panel-type ticket vending machine having an infrared or ultrasonic touch panel, wherein a detection region in a display area of each fare button is made small, and a perimeter of the display area is a non-detection region. This arrangement makes it impossible to detect a light touch of the user's finger on the display area of the fare button, thus preventing an erroneous entry.

Patent document 2 (Japanese Laid-Open Patent Application No. 2000/253288 (Tokukai 2000-253288; published on Sep. 14, 2000) discloses the invention in which (a) a liquid crystal display panel provided in an image picking-up device like a video camera and an electronic still camera has a touch panel, (b) a sensing region corresponding to a pictograph displayed in an outer frame around the liquid crystal display panel is set on the touch panel so as to be adjacent to the corresponding pictograph, and (c) an area of the sensing region is larger than a display area of the corresponding pictograph. According to the patent document 2, it is operationally preferable that this invention cause the image picking-up device to perform an operation corresponding to the pictograph upon user's touch of the sensing region adjacent to the pictograph.

Patent document 3 (Japanese Laid-Open Patent Application No. 2003/280782 (Tokukai 2003-280782; published on Oct. 2, 2003) discloses an operation key device wherein various keys are displayed on an operation panel of an electronic information processing apparatus, such as the multiple function printer, and according to usage frequency of the displayed keys, a key image of a key used at a high frequency is changed in size and shape in conjunction with its detection region. According to the patent document 3, this arrangement allows the user to easily find necessary keys and to perform key operation without operation error.

However, in many devices, available keys vary depending upon user selected operation, user's setting, the presence or absence of options, or the like, even when contents displayed on the operation screen that accepts user's instructions are the same or similar among the devices. In this case, unavailable keys are made disappear from the operation screen or grayed out to be inconspicuous, whereas available keys are placed at the same position as possible to prevent the user from being confused.

In the case of the ticket vending machine described in the patent document 1, some fare buttons whose indicated amounts fall within the range of an amount inserted into a slot usually become available for display in ascending order, whereas the other fare buttons become unavailable for display. Therefore, a less amount inserted into the slot increases invalid area, but the setting of making the detection region smaller than the display area of the fare button is not changed.

That is, a certain fare button is always placed at the same position on the screen and just switched back and forth between availability (valid) and unavailability (invalid) for display. Therefore, there is no change in spacing between the fare buttons. Thus, it is only considered to prevent erroneous detection of the fare buttons.

Accordingly, the invention of the patent document 1 cannot optimize an ease of touch on the fare button and prevention of erroneous detection depending upon the number of fare buttons displayed.

Further, in the invention of the patent document 2, pictographs shown in an outer frame around the liquid display panel are printed or engraved on its surface so as to be displayed at fixed positions, so that settings of the sensing regions corresponding to the respective pictographs are also fixed. Therefore, a design of the pictograph cannot be changed according to a content of user selected operation. Accordingly, it is impossible to change the sensing region in size according to a content of the operation for optimization of usability.

Still further, the invention of the patent document 3 merely discloses that a key used at a high frequency is changed in size or shape, with a key image being in conjunction with a detection region. That is, it is impossible to enhance operability by preventing erroneous detection in such a manner that a detection region of the available key is made larger so that detection is possible even with user's rough operation, when some keys become unavailable according to a content of the operation, and available keys are sparsely displayed on the screen, or conversely, the detection area is made smaller when the keys are densely displayed on the screen.

As described above, none of the above patent documents suggest that according to the operational status of the device, the detection region of the keys is changed in size with change in placement (key arrangement) of the keys, such as a position on the screen where the keys are displayed and the number of keys displayed on the screen.

SUMMARY OF THE INVENTION

An object of the present invention is to provide an information processing device such as a display operation device, obtained by integrating a display device with a coordinates input device (tablet), which changes a dimension of a key detection region in accordance with a key arrangement in a screen, so as to optimize an effect of preventing erroneous detection and an operation property.

(1) In order to attain the object, a method according to the present invention for processing information that defines a dimension of a detection region of a key displayed on a screen of an information processing device, where the detection region is adjacent to an invalid region, the detection region being a region in which touching of the screen in this region or local approaching to this region is detectable, and the invalid region being a region in which the touching of the screen in this region or local approaching to this region is not detectable, is so arranged as to include: when a distance across the invalid region from an edge of a key display region (display region) exceeds a first threshold value, generating, by the information processing device, a detection region data that defines an extent of the detection region with respect to a dimension of the key display region so that the detection region becomes larger than the key display region by utilizing the invalid region.

In the foregoing configuration, touching of the screen of the information processing device is such an operation that a user uses a part of his body (e.g., a finger or the like) or a tool such as an input pen so as to give physical quantity change such as pressure change, voltage change, resistance change, magnetic change, or the like, which can be detected by the information processing device. Further, local approaching to this region is such an operation that the user approaches a part of his body (e.g., a finger or the like) or a tool such as an input pen to the screen with the user not in contact with the screen.

The detection region is set in the information processing device by using positional information indicative of a position in the screen, and corresponds to a key displayed in the screen. An extent of the detection region is indicated by detection region data for specifying the range by using the positional information. When positional information indicative of a position in the screen which position has been selected by the user utilizing the physical quantity change is detected, a key corresponding to a detection region including the positional information is determined, thereby specifying the key selected by the user.

When a key corresponding to the detection region is displayed in the screen, generally, a region adjacent to the key display region is a region which has not been set as the detection region, that is, the adjacent region is an invalid region which is not detectable with respect to the operation of the user. The invalid region is sometimes formed so as to surround the key display region of the key and is sometimes formed so as to be positioned adjacent only to one side of the key display region of the key. That is, how the invalid region is positioned adjacent to the key display region is not particularly limited.

In the information processing method of the present invention, an extent of an invalid region adjacent to a key detection region is found from a distance across the invalid region between edges of key display regions. That is, when the distance exceeds a first threshold value, it is possible to expand the detection region to the invalid region, so that the information processing device generates detection region data which defines an extent of the detection region on the basis of a dimension of the key display region so that the detection region is larger than the key display region.

The case where the distance exceeds the first threshold may be also denoted as a case where a distance between (a) a point being in an invalid region adjacent to the key display region of the key and (b) a point being on an edge of the key display region of the key exceeds the first threshold.

On this account, the detection region is larger than the key display region. Thus, even when the user performs such a rough operation that his operation for selecting a key deviates from the key display region, the information processing device can detect a position of the key selected by the user. That is, in case where there is a blank space in the screen displaying keys, it is possible to facilitate the user's operation for selecting a key.

(2) In order to attain the object, an information processing device according to the present invention including a screen for displaying at least one key that is selectable by touching the screen or locally approaching the screen, and a detection region in which selecting of the key is detectable, is so arranged as to includes: an operation managing section for determining key arrangement on the screen in accordance with operation status of an apparatus to which the information processing device is provided; and a detection managing section for updating positional data of the detection region on the screen so that an extent of the detection region is adjusted in accordance with the key arrangement thus determined by the operation managing section.

According to the foregoing configuration, when positional information indicative of a position of the screen touched by the user or locally approached is detected in accordance with physical quantity change as described above, a key corresponding to a detection region having the positional information is determined, so that the information processing device determines a key selected in the screen by a user. A result of the determination is transmitted to a device provided with the information processing device, and the device operates as instructed by the user.

Here, the operation managing section determines the key arrangement in the screen according to an operation status of the device. This is because types and the number of keys which should be displayed in the screen change depending on an operation status of the device at each time. For example, in case where the device is a copying machine, information notified from the copying machine to the user and an instruction receivable from the user change depending on an operation status: right after turning on the device; when a copying operation becomes allowed; when the user changes the setting so that sheets are fed from a manual feeding tray.

Further, when the key arrangement in the screen changes depending on the operation status, formation of the invalid region around a key and an interval of plural keys, that is, an interval of detection regions adjacent to each other changes. According to the present invention, the operation managing section changes an extent of the detection region in accordance with the key arrangement, so that it is possible to optimize a balance between an effect of realizing easier key selection and an effect of preventing erroneous detection without depending on an operation status of the device.

Note that, the operation status includes not only an operation condition of each part of the device but also (i) the number of times the device carries out a predetermined process, (ii) a usage status including a usage history of each function of the device, (iii) an interior status indicated by a sensor output or the like provided on each part of the device, and (iv) the like.

The present invention is applicable to a display operation device including a display device for displaying keys for user input, and a position input device for detecting user's key selection and generating positional information such that they are integrally provided. Further, the present invention is applicable to every device that includes the display operation device and that operates in accordance with user input received via the display operation device.

For a fuller understanding of the nature and advantages of the invention, reference should be made to the ensuing detailed description taken in conjunction with the accompanying drawings.

DESCRIPTION OF THE EMBODIMENTS

Figure 1:
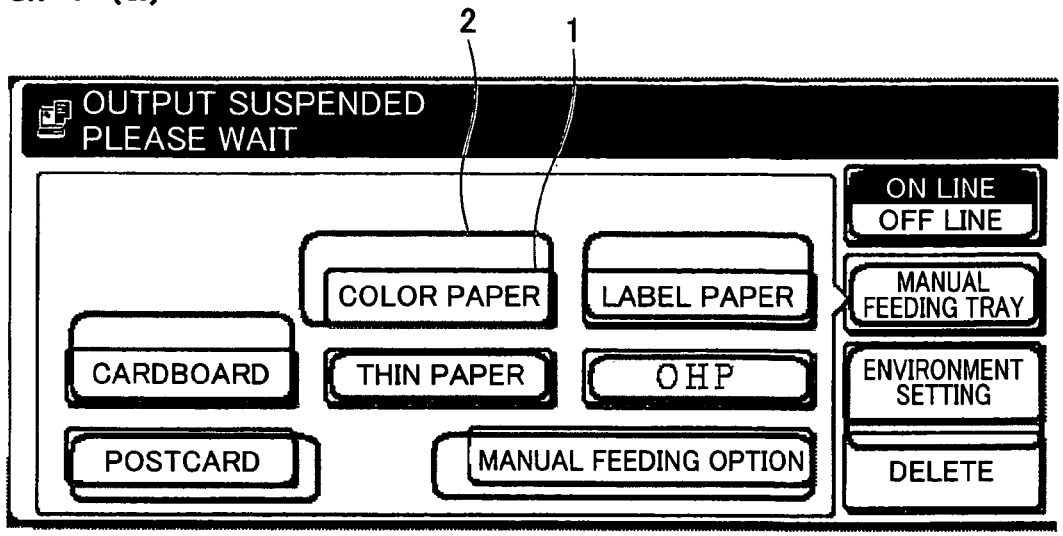
FIG. 1(a) is an explanatory view of a display screen of an information processing device of the present invention, illustrating a state in which some of the keys used to make entry have been inactivated, and in which detection regions for active keys have been enlarged by using display regions of inactive keys.
FIG. 1(b) is an explanatory view illustrating a state in which all the keys have been activated in a certain operation state.
Figure 1:
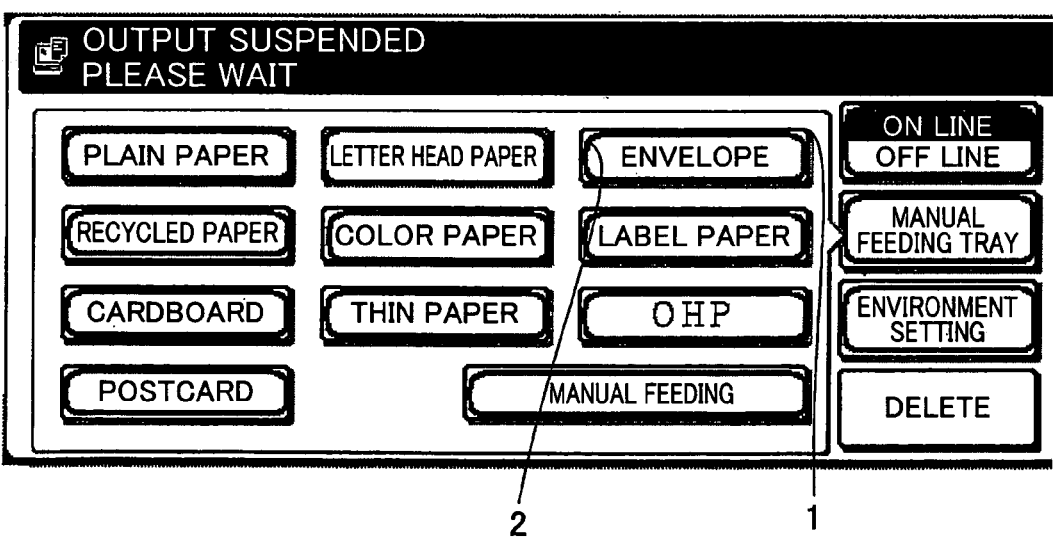

An exemplary embodiment of an information processing method and an information processing device according to the present invention is described below, referring to drawings.

Firstly, the following gives a general description on how a display screen on which a key (a button, icon, or the like) for receiving user's instruction is displayed is changed by the information processing method and information processing device according to the present invention.

Illustrated in FIG. 1(b) is a display screen mounted on an operation panel of a multifunction machine having a plurality of functions as a copy machine, a printer, a scanner, and the like, together with a function of communicating with another information processing device. On the display screen, displayed are keys indicative of which kinds of paper the multifunction machine can accept via a so-called manual feeding tray, when a user selects the manual feeding tray. The manual feeding tray allows the user to feed a paper arbitrarily for recording, on the paper, an image processed by the multifunction machine.

For example, in case of a key of "ENVELOPE" which indicates an envelope as the kind of the paper, an outer frame 1 has a key shape, which the user actually recognizes as a key. On the other hand, an inner frame 2 virtually indicates a region in which it is possible to detect whether the user select the "ENVELOPE" or not. The inner frame 2 is actually set as a detection region data that stipulates a position and area by using a positional information (e.g. coordinates) on the display screen. A later described storage section 16 stores the detection region data.

In a standard state in which the keys for all kinds of paper that are acceptable for the manual feeding tray are displayed, the outer frame 1 illustrating the key-like shape and the inner frame 2 indicating the detection region are arranged to be substantially identical in size (the inner frame 2 is slightly smaller than the outer frame 1).

On the contrary, FIG. 1(a) illustrates display on the display screen in a case where some of the keys are deleted from the screen and invalidated, e.g. as a result of a change in setting of the kinds of paper that are acceptable to the manual feeding tray. In this case, a relationship between a size of the key-like shape and a size of a detection region is changed from that in the standard state by the information processing method and the information processing device according to the present invention.

More specifically, in case of keys indicative of "CARDBOARD", "COLOR PAPER", "LABEL PAPER", detection regions of these keys are expanded by utilizing (i.e. expanded into) invalid regions (vacant regions) formed as a result of invalidation of other keys existed above these keys before the invalidation.

Moreover, in case of keys indicative of "POSTCARD", "MANUAL FEEDING OPTION", their detection regions are expanded by utilizing vacant regions that have existed around them since before the invalidation.

Further, in case of a key indicative of "DELETE", both in FIGS. 1(a) and 1(b), this key is not used in a paper feeding mode in which the manual feeding tray is used. Thus, characters "DELETE" is grayed out so that the characters are less conspicuous, thereby indicating this key is not available (invalid). A detection region of this key "DELETE" is invalidated. In FIG. 1(a), a display position of the key not selected is utilized to allow a detection region of an adjacent key (in this case, a key "ENVIRONMENT SETTING") to be enlarged.

The present invention is, as described above, arranged such that the size of the detection region with respect to a key display (button display) is changed according to status of key arrangement including information as to whether there is another valid key around a target key (key in question). If there is another key in a vicinity of the target key, the detection region of the target key is caused to be smaller than a key display region of the target key, thereby preventing erroneous detection. If there is a vacant around the target key or if an interval between the target key and the another key is large enough, the detection region of the target key is caused to be larger than the key display region of the target key. With this, selecting of the target key can be detected even with user's rough manipulation. This arrangement gives an apparatus including the information processing device according to the present invention a higher operationality.

The key arrangement is varied according to (i) screen corresponding to a process selected by the user so as to cause the apparatus to perform the process, (ii) processing status of the apparatus, (iii) whether an optional device is attached or not, and (iv) the like. More specifically, a number of keys to be displayed on the screen, a shape of the key to be displayed, order of the keys to be displayed, or intervals between keys to be displayed, are varied according to steps executed by various programs for controlling operation of the apparatus the display position of the key on the screen.

Moreover any one of, some of, or all of the plurality of keys displayed on the screen may be the target key(s). Further, the effect of the invention mentioned above may be also attained by changing the detection region of the target key without changing the key display region of the target key. However, the key display region of the target key may be expanded/shrunk in accordance with the detection region.

In the following, the information processing device according to the present invention that attains the above effect, and the information processing method using the information processing device are specifically described.

[First Embodiment]

Figure 2:
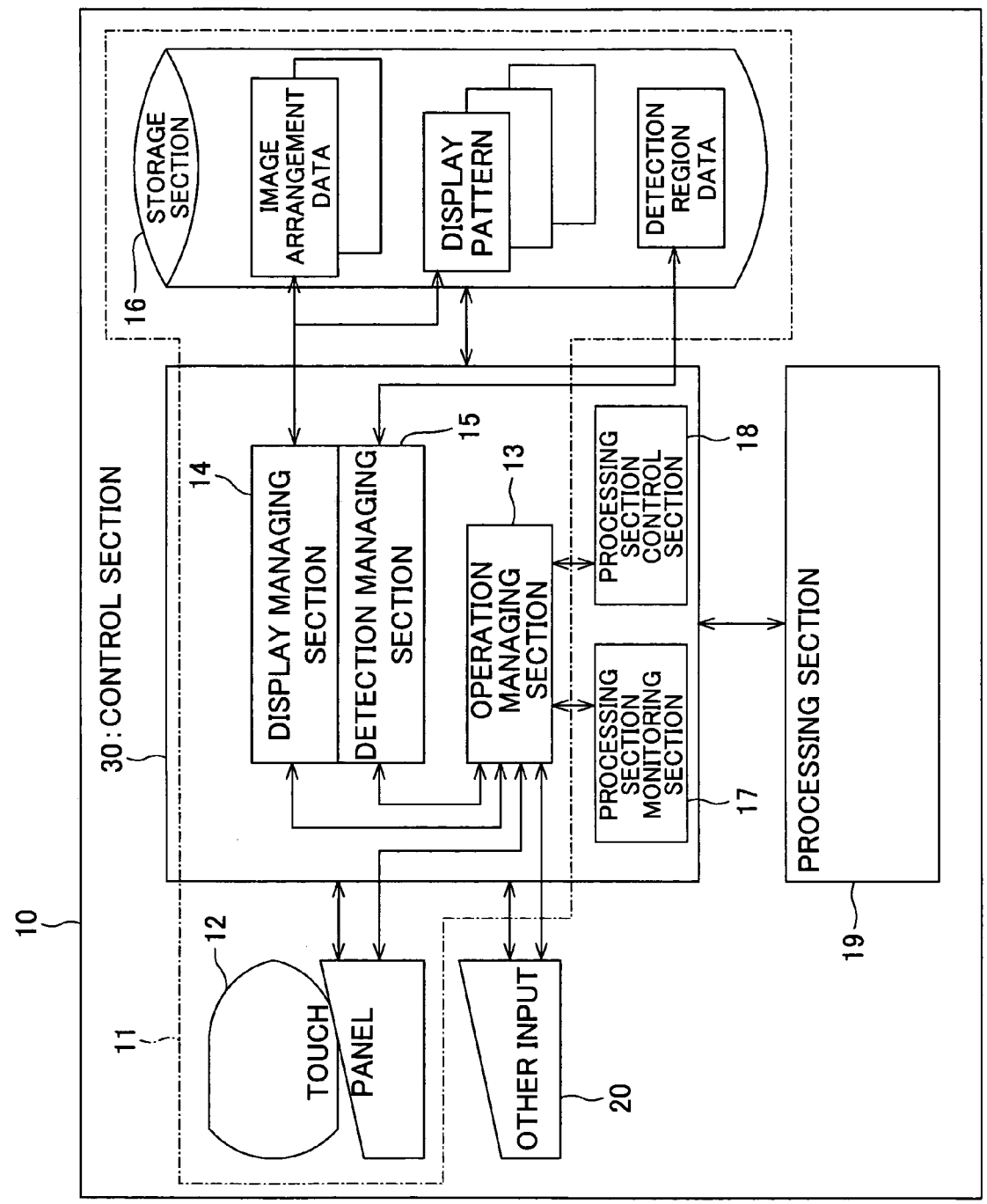
FIG. 2 is a block diagram illustrating a structure of an information processing device of the present invention, and an apparatus in which the information processing device is installed.

FIG. 2 is a block diagram illustrating respective structure examples of an image output device according to the present invention for carrying out image recording into a storage medium, and an information processing device provided in the image output device. For ease of explanation, the present embodiment uses the foregoing multifunctional device as the image output device.

First of all, the following explains the structure of an image processing device 11 provided in a multifunctional device 10. As shown in FIG. 2, the information processing device 11 includes a touch panel (display touch panel) 12 provided in an operation panel (not shown) of the multifunctional device 10. The touch panel 12 includes a display device such as a LCD (liquid crystal display), and a coordinates input device (tablet) for detecting a coordinates of a certain position specified by a command from a user, which command is made either by touching its screen or without touching the screen Those devices are combined together in the touch panel 12.

According to the circumstances, the touch panel displays on its screen an operation status of the multifunctional device 11, some information items regarding the device operation, various keys (button, icon etc.) for allowing users to input contact/non-contact commands. As mentioned above with FIG. 1(*b*), the keys are displayed with the outer frames, so that the keys are recognizable to the user. Meanwhile, the outer frame 1 indicates the key display region of the key. Each key has a corresponding detection region (inner frame 2) for the coordinates input device.

More specifically, the positional information indicating the key display region of a key on the screen is associated with the detection region data, which is positional information of the corresponding detection region that corresponds to the key.

The input/output made thorough the touch panel 12 is transmitted to/from an operation managing section 13. The operation managing section 13 receives coordinates information, which indicates the position specified by a user through the touch panel 12. Moreover, the operation managing section 13 also detects operation status (including a usage status or an interior status) and selects one of the keys matching with the operation status so as to create key judgment information regarding validity and invalidity of keys (i.e. key judgment information regarding whether the keys are required or not). More specifically, the key judgment information contains information indicative of valid keys required in the operation states detected by the operation managing section 13, and invalid keys not required in the operation status.

The invalid keys may be grayed out in display so as to inform the user that these keys are not available. Similarly, the items, which are not involved in the processing and may cause some confusion on user's selection, may be deleted from the screen.

The operation status indicates various operation conditions: power-on of the multifunctional device 10, stand-by state, and various processing stages during image forming process with respect to a paper. As well as this, the operation status further includes a usage status such as number of image forming operations, usage history for each function of the multifunctional device 10, and/or an interior status informed by an output from a sensor provided in each section of the multifunctional device 10.

The operation managing section 13 has other input/output connections with the display managing section 14 and the detection managing section 15.

The display managing section 14 receives information regarding the operation status, or key judgment information from the operation managing section 13, and determines display state of valid keys on the screen according to the operation status detected by the operation managing section 13. More specifically, the display managing section 14 determines the screen layout (key arrangement), which involves the position, shape, and size of the valid keys in display. The way of determination is described later in detail.

The detection managing section 15 receives information regarding the operation status or key judgment information from the operation managing section 13, and determines the detection region for each key according to the coordinates position on the touch panel 12, so that the size, shape, position, and/or the like of the detection region are appropriately set for the current operation status. The detection managing section 15 therefore plays the most important role in the present invention. The operation of the detection managing section 15 is also described later in detail.

The display managing section 14 and the detection managing section 15 have other input/output connection with a storage section (storing section) 16, which includes such as a ROM (Read Only Memory), a RAM (Random Access Memory) or a HD (Hard Disk).

As described, the image processing device 11 of the present embodiment includes the touch panel 12, an operation managing section 13, a display managing section 14, the detection managing section 15, and the storage section 16.

The operation managing section 13 has other input/output connection with the processing monitoring section 17 and the processing control section 18. For its main function, the processing monitoring section 17 generates a supervision report as to whether or not the multifunctional device 10 is connected to any optional devices, which report is made as a detection signal of a sensor or the like, and then outputs the signal to the operation managing section 13. This allows the operation managing section 13 to appropriately perceive which keys are required (valid) for the optional device and which are not required (invalid). The processing monitoring (processing supervising) section 17 with such a function is therefore not required when no optional decides are used.

Further, the processing control section 18 monitors (supervises) the operation status of the multifunctional device 10 by detecting respective statuses of the plural processing units constituting the processing section 19: a scanner section, an image processing section, an image forming section etc. The processing control section 18 also creates a monitoring (supervision) report as to whether the respective units operate properly or not, and outputs the monitoring report to the operation managing section 13. Further, when a command is supplied to the operation managing section 13 through the touch panel 12 or other input sections 20, the processing control section 18 receives from the operation managing section 13 the order to execute the processing (event) corresponding to the command, and then transmits the command to the corresponding processing section 19. As a result, the processing section 19 practically executes the image processing.

In this manner, the operation managing section 13 is notified of operation status of the multifunctional device 10 by receiving the supervision report from the processing control section 18.

For example, when some kind of error, for example, paper jam, occurs in the image forming section, a processing monitoring section 17 informs the operation managing section 13 of the details of error. On this notification, the operation managing section 13 appropriately perceives which keys are required (valid) to handle the error and which are not required (invalid) among the plural keys, according to the condition of error.

The operation managing section 13, the display managing section 14, the detection managing section 15, processing monitoring section 17 and the processing control section 18 constitute a control section 30 of the multifunctional device 10. The control section 30 can be realized by a CPU (central processing unit) and a program in which functions of the respective sections 13, 14, 15, 17 and 18 are written.

The multifunctional device 10 further includes another input section as an interface device for enabling input/output of information via a wireless or wired network with other multifunctional devices, computers, mobile terminal devices or the like.

Next, the following explains screen layout data, display pattern data, and detection region data which are stored in the storage section 16. The screen layout data specifies individual positions of the keys in the screen. To reduce the load of the display managing section 14 which determines the screen layout (key arrangement), it is preferable to previously create and store screen layout data for each operation status of the multifunctional device 10 in the storage section 16.

This allows the display managing section 14 to select appropriate screen layout data from the storage section 16, according to a real-time operation status of the multifunctional device 10 supplied from the operation managing section 13, or the key judgment information regarding the valid/invalid keys.

Note that, the screen layout data may be created each time as required by causing the display managing section 14 to execute a program for determining the screen layout (key arrangement), and storing the data in the storage section 16. However, it is preferable also in this case that the display managing section 14 associates the key judgment information with the screen layout data in advance, and reuses the predetermined screen layout data for the same key judgment information.

Next, the display pattern data specifies display patterns of various display objects, such as keys (button, icon etc.), display frame etc. Each display pattern data is given a different display object.

With such an arrangement, the display managing section 14 reads out appropriate display pattern data for the valid keys from the storage section 16 according to the selected screen layout data and the key judgment information, and arranges the valid keys in the screen according to the position specified by the screen layout data. As to the invalid key, the display pattern data is not required if the invalidation of a valid key causes a display area of the invalidated key to be blank (i.e. deletes the invalidated key); however, if the invalid keys are displayed in the gray-out from, which is less visible, display pattern data for invalid keys needs to be stored in the storage section 16.

Further, to allow changes in size or shape of the keys by changing the number or display position of keys according to the operation status of the multifunctional device 10, it is preferable to prepare different items of display pattern data (data respectively corresponding to a plurality of display patterns) for each of the plural keys identical in function.

Though the multifunctional device 10 is allowed to use many items of layout data for specifying the display key layout for various operation statuses, it is more preferable to prepare the screen layout data and the display pattern data separately, as in the present embodiment, so as to ensure flexibility of display layout.

The detection region data (referred to as position data of the detection region in claims) is predetermined information for specifying the respective detection regions for individual keys. More specifically, the detection region data is in coordinates which specify the position and range of each detection region on the screen.

For example, assume that the detection region data shown in FIG. 1(*b*) is a standard or default detection region data where the outer frame 1 as the display frame of each key and the inner frame 2 for indicating the detection region are identical in size, the detection region data may be created each time as required by causing the detection managing section 15 to execute a program for determining the detection region (key arrangement), and storing the data in the storage section 16 as shown in FIG. 1(*a*), when the detection region of a key is enlarged according to the operation status of the multifunctional device 10.

However, as with the screen layout data, in order to reduce the load in operation of the detection managing section 15, it is preferable to create, in advance, a plurality of enlargement/reduction patterns for the detection region for each operation status of the multifunctional device 10 and store the enlargement/reduction patterns as detection region data in the storage section 16, so as to enable the detection managing section 15 to select an appropriate enlargement/reduction pattern according to the key judgment information.

The detection region data thus prepared in advance includes: (i) the range of enlargement of detection region of the target key when no key is provided around the target key, (ii) the range of reduction of detection region of the target key in consideration of the interval between the target key and the adjacent key, and (iii) instruction for determining the size and shape of each detection region depending on the conditions.

Note that, also in the arrangement in which the detection managing section 15 creates detection region data each time as required and stores the data in the storage section 16, it is preferable that the detection managing section 15 associates the key judgment information or operation status with the detection region data in advance, and reuses the predetermined detection region data for the same key judgment information or operation status.

Note that, the foregoing arrangement, in which plural items of the screen layout data and the detection region information are stored by being associated with various operation statuses of the multifunctional device 10, is particularly suitable for the case where the keys are fixed to specific positions in the screen, these keys become valid/invalid depending on their display states. This is because this arrangement with the keys fixed to specific positions uses less variation of enlargement/reduction pattern of the display layout and the detection region.

OPERATION EXAMPLE 1

According to the foregoing configuration, an operation of the information processing device 11 will be described through the case of the stationary arrangement in which the arrangement of displayed keys on the screen (for example, the number and order of displayed keys) is determined beforehand.

When the processing section 19 of the multifunction device 10 is in a certain state, the processing control section 18 sends a monitoring result concerning a state of the processing section 19 to the operation managing section 13. In response to the monitoring result, the operation managing section 13 grasps the operation status of the multifunction device 10.

When a user selects a certain position on the screen through the touch panel 12, the coordinates indicative of the selected position are input to the detection managing section 15 through the operation managing section 13. In response, the detection managing section 15 compares the coordinates with the coordinates information of each detection region, so as to judge whether the user has selected a key. If the selected coordinates are found in a detection region, it means that this detection region corresponds to the key selected by the user. This is informed to the operation managing section 13 by the detection managing section 15.

In this way, the operation managing section 13 is allowed to grasp the next intended operation of the multifunction device 10. The operation managing section 13 is also able to instruct the processing section 19 through the processing control section 18 to execute a process (event) corresponding to the selected key, and grasp the operation status of the processing section 19 executing the process. The operation managing section 13 grasps the operation status of the multifunction device 10 in the described manner, based on an input signal not only from the touch panel 12 but also from other input sections 20.

Further, for the current operation status, the operation managing section 13 specifies valid keys and invalid keys to be displayed on the screen, and thereby creates key information. The operation status and key information are sent from the operation managing section 13 to the display managing section 14 and the detection managing section 15.

In response, layout data corresponding to the operation status is read out from the storage section 16 by the display managing section 14. Based on the key information, the display managing section 14 reads out from the storage section 16 display pattern data for the valid keys (activate keys) and invalid keys (inactivate keys) to be displayed.

Similarly, detection region data corresponding to the operation status and key information are read out from the storage section 16 by the detection managing section 15. Here, the detection region data may be read out by searching for detection region data of each valid key, or by selecting a detection region data set which has been created by combining detection region data of valid keys beforehand.

Figure 3:
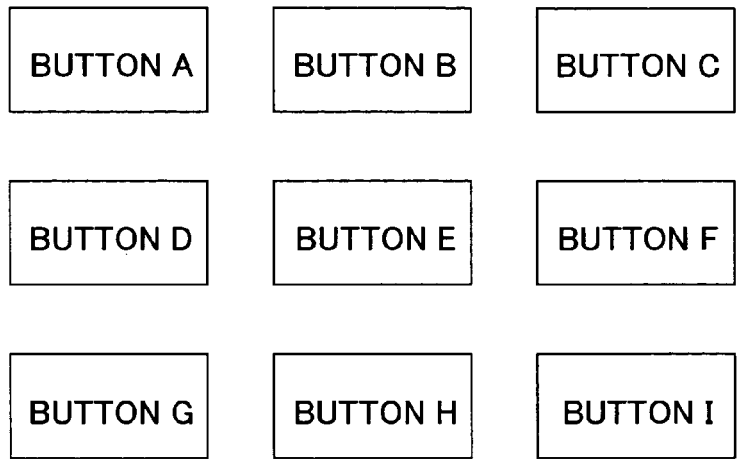
FIG. 3(a) is an explanatory view illustrating a default state in which key display regions and key detection regions coincide.
FIG. 3(b) is an explanatory view illustrating a state in which a detection region of each key has been reduced in response to reduced intervals of displayed keys.
FIG. 3(c) is an explanatory view illustrating a state in which a detection region of each key has been enlarged in response to increased intervals of displayed keys.
Figure 3:
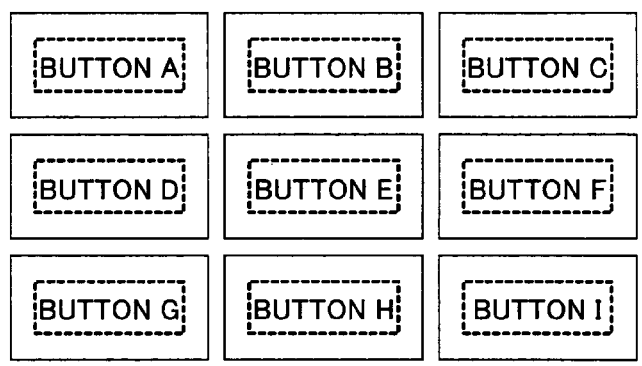
Figure 3:
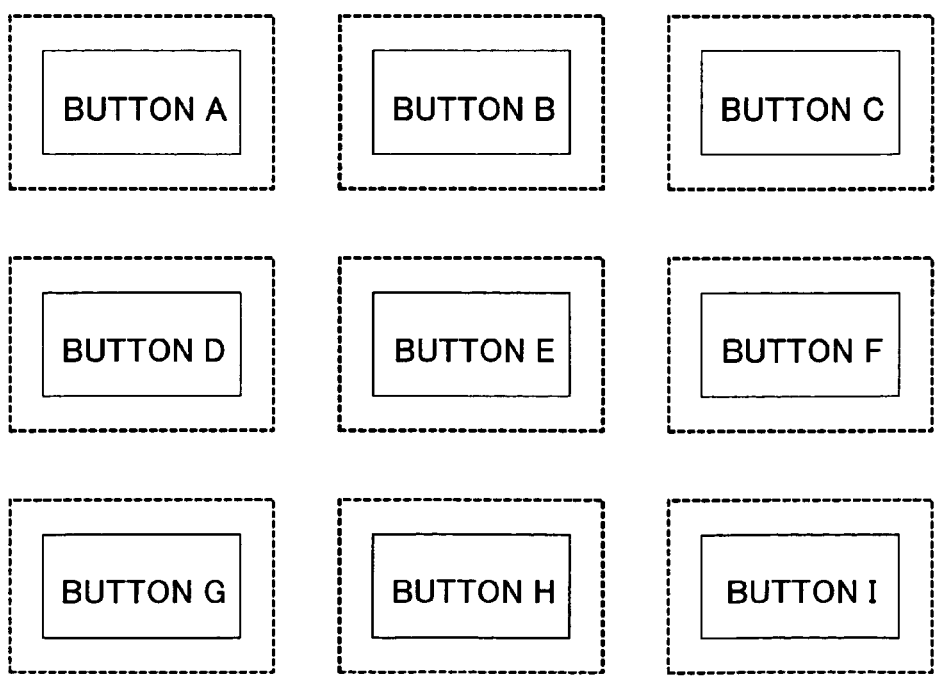

As a result, buttons (keys) A through I are displayed in the 3×3 (3 row×3 column) layout as shown in FIG. 3(a). FIG. 3(a) shows a standard state in which the buttons A through I are sized to match their respective detection regions.

Assume that the operation status of the multifunction device 10 has changed, and that the change, for example, in the content of information to be displayed in the screen has necessitated reduction of the key layout from the standard state shown in FIG. 3(a). As in the foregoing case, screen layout data corresponding to the new operation status is read out from the storage section 16 by the display managing section 14. Display pattern data indicative of valid keys and invalid keys to be displayed is also read out from the storage section 16 based on the key information. Further, detection region data corresponding to the new operation status and key information is also read out from the storage section 16 by the detection managing section 15.

As a result, as shown in FIG. 3(b), the intervals of displayed buttons A through I are reduced according to the newly selected screen layout data. Accordingly, the detection regions of the buttons A through I are also reduced according to the newly selected detection region data, while maintaining enough intervals to prevent detection errors. As such, the detection regions of the buttons A through I are smaller than the key display regions of the buttons A through I.

New screen layout data and new detection region data are also selected in the same manner when a new operation status of the multifunction device 10 necessitates enlargement of the displayed key layout from the standard state shown in FIG. 3(a).

In this case, as shown in FIG. 3(c), the intervals of displayed buttons A through I are increased according to the newly selected screen layout data. Accordingly, the detection regions of the buttons A through I are enlarged according to the newly selected detection region data, so as to allow for detection even when the user has operated the device carelessly. That is, key selection is made easier. As such, the detection regions of the buttons A through I are larger than the key display regions of the buttons A through I. Even in this case, enough intervals are provided for the detection regions, so that no detection error occurs.

In this manner, the detection regions can be enlarged or reduced according to a change in the intervals of displayed keys as necessitated by the operation status of the multifunction device 10. In this way, an optimum balance is always achieved between the effect of preventing detection errors and the effect of allowing for easy key selection.

OPERATION EXAMPLE 2

The following will discuss the operation of the information processing device 11, in a case where the key arrangement (such as the number and order of displayed keys) displayed on the screen is determined in advance and the keys are switched so as to be validated/invalidated.

Figure 8:
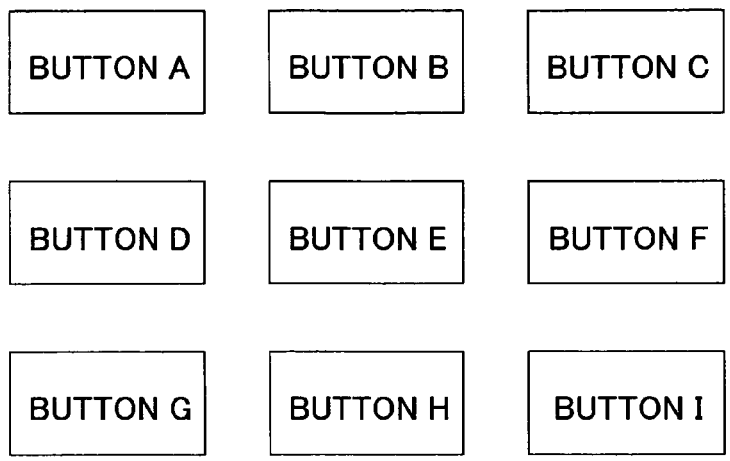
FIG. 8 is an explanatory view illustrating a default state in which key display regions and key detection regions coincide.

Being similar to FIG. 3(a), FIG. 8 shows a standard state where the size of each button (A through I) is identical with the corresponding detection region, and all of the buttons A through I are valid.

Meanwhile, FIGS. 9(a)–9(f) illustrate respective cases where the detection region is altered at the time of invalidating one of the buttons A through E. More specifically, the figures show various patterns in a case where the detection region of a valid key is expanded over the key display region (cross-hatching part) of an invalid key.

Figure 9:
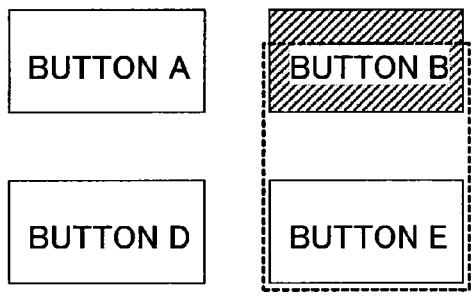
FIG. 9(a) through FIG. 9(f) are explanatory views illustrating variations of a state in which some of the keys shown in FIG. 8 have been switched from an active state to inactive state, and in which detection regions of active keys have been enlarged by using display regions of inactive keys.
Figure 9:
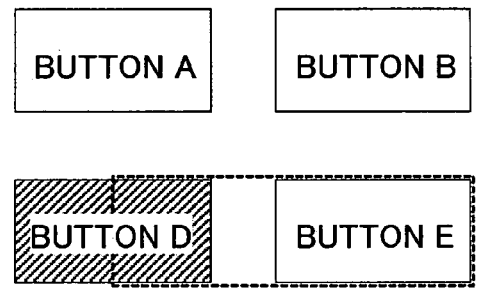
Figure 9:
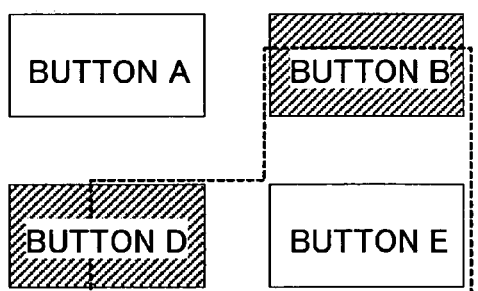
Figure 9:
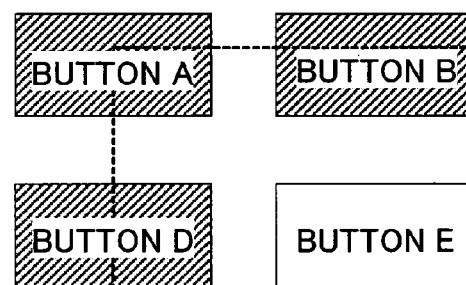
Figure 9:
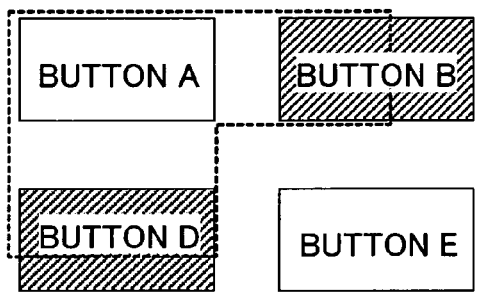
Figure 9:
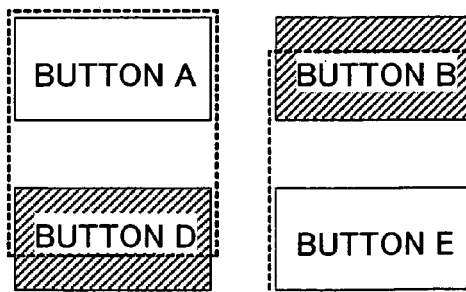

The expansion of the detection region can be performed in all directions, e.g. in one direction lengthwise (FIGS. 9(a), 9(f)), in one direction crosswise (FIG. 9(b)), in two directions lengthwise, in two directions crosswise, and in one direction lengthwise and one direction crosswise (FIGS. 9(c) and (e)), in three directions, and in an oblique direction (FIG. 9(d)). Note that, an order of priority is preferably set to the directions of the expansion. For instance, in a case where a button is long crosswise, as long as the button stays narrow lengthwise, the easiness of button selection is not really facilitated even if the detection region is expanded in the crosswise direction. On this account, it is preferable that a higher propriety be given to a direction with which the detection region is expanded so as to resemble a circle or a square.

To further facilitate the user-friendliness, it is preferable that, in accordance with the usage frequencies of valid keys, a key with a high usage frequency be given a precedence of expansion over a key with a low usage frequency. For instance, when the buttons B and D among the buttons A through E are invalidated as shown in FIG. 9(c), the usage frequencies of the buttons A and E are compared. If the usage frequency of the button E is higher than that of the button A, the detection region of the button E is expanded over the key display regions of the buttons B and D, as shown in FIG. 9(c).

FIG. 9(b) shows a case where a priority is given to the detection region of the button E over the detection region of the button A, because the usage frequency of the button E is higher than that of the button A.

When two valid keys have identical usage frequencies or more or less identical usage frequencies, the detection regions of the respective valid keys are expanded in a similar manner as shown in FIG. 9(f). FIG. 9(f) shows such a case that, being different from the case in FIG. 9(c) or 9(e), the usage frequency of the button A is almost equal to the usage frequency of the button E, so that the detection regions of the respective buttons A and E are similarly expanded over the key display regions of the invalid keys respectively adjacent to the detection regions in the lengthwise direction.

As described above, the detection regions are expanded over the key display regions of the invalid keys respectively adjacent to the detection regions in the lengthwise direction, because, as compared to the expansion in the crosswise direction, the above-described expansion in the lengthwise direction makes the detection regions be in a more compressive shape.

The operation of the information processing device 11 for obtaining the processing result shown in FIGS. 9(a)–9(f) will be discussed in reference to the flowchart in FIG. 4.

Figure 4:
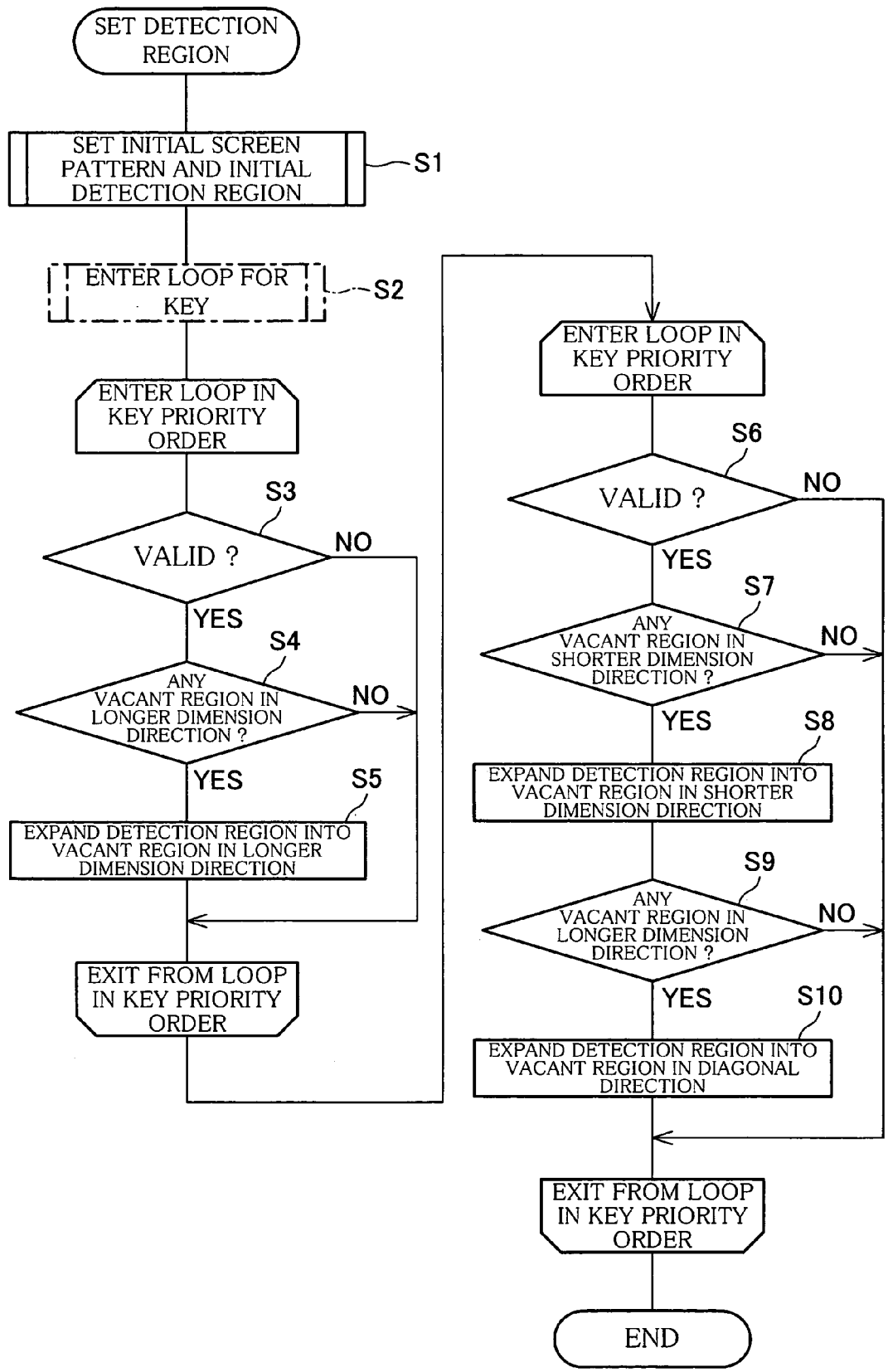
FIG. 4 is a flowchart illustrating a processing procedure according to an information processing method of the present invention.

The detection region setting processing shown in FIG. 4 starts at a time when the multifunction device 10 is developed into a certain state.

Figure 6:
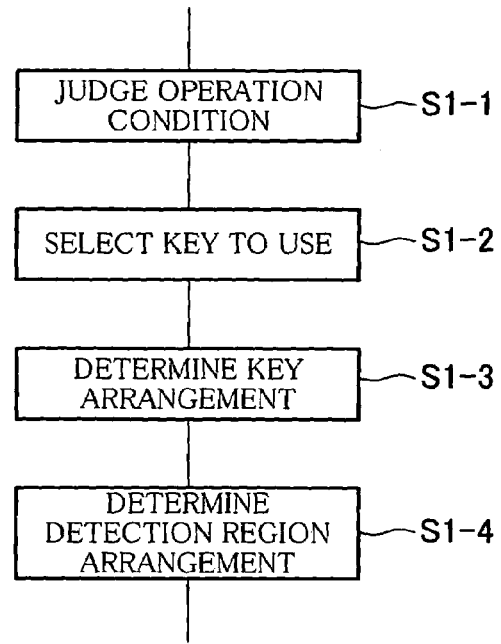
FIG. 6 is a flowchart illustrating a detailed procedure of step 1 shown in FIG. 4 and FIG. 5.

Step (hereinafter, S) 1 is a routine for initial setting of patterns of the pattern on the screen and the detection regions. FIG. 6 describes the routine of S1 in detail. As in the case of Operation Example 1, for the start, the operation managing section 13 identifies and grasps the operation status of the multifunction device 10, in reference to a monitoring result supplied from the processing monitoring section 17 and a signal supplied from the touch panel 12 or another input section 20 (S1-1).

Subsequently, in accordance with the grasped operation status, the operation managing section 13 decides which valid keys and invalid keys are displayed on the screen, and generates key information as a result of the decision (S1-2). That is, valid keys available for the user are selected. The operation status and the key information are supplied from the operation managing section 13 to the display managing section 14 and the detection managing section 15.

Then the display managing section 14 reads out, from the storage section 16, screen layout data associated with the operation status, and also reads out, from the storage section 16, display pattern data indicative of valid keys and invalid keys to be displayed, in accordance with the key information. At this stage, the layout of the keys on the screen is determined (S1-3).

In a similar manner, the detection managing section 15 reads out, from the storage section 16, detection region data associated with the operation status and the key information. At this stage, the layout of the detection regions on the screen is determined (S1-4).

A key loop processing routine (loop for key) in S2 subsequent to S1 is performed when, in S1, the initial setting of the screen layout data and the detection region data is performed in accordance with the operation status. For example, the routine of S2 is performed if the initial setting made in S1-3 and S1-4 is such that the layouts or display status of the keys and the arrangement of detection regions correspond to a standard state shown in FIG. 1(b) are displayed initially in a paper feeding mode of the multifunction device 10, the paper feeding mode using a manual paper feed tray.

In S2, in order to cause the display status of the displayed keys and the layout of the detection regions to be in line with the actual operation status grasped in S1-4, display pattern data regarding all keys and detection region data, which are set as the standard state, are modified.

Figure 7:
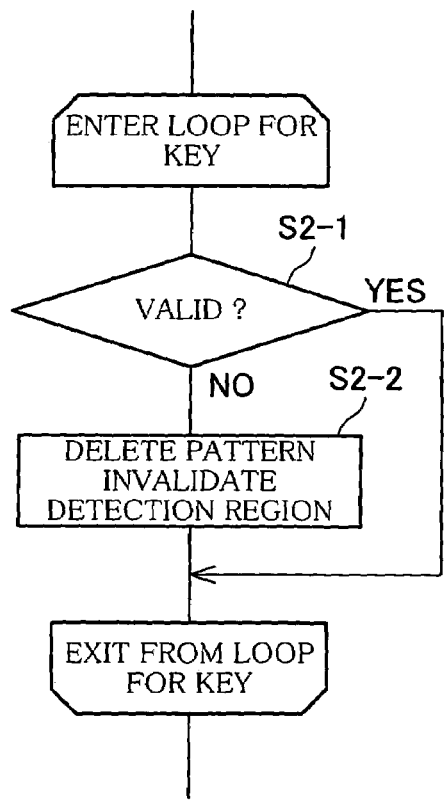
FIG. 7 is a flowchart illustrating a detailed procedure of step 2 shown in FIG. 4 and FIG. 5.

More specifically, as FIG. 7 shows, the display managing section 14 and the detection managing section 15 check the validity/invalidity of all keys appearing in the standard state, in reference to the information of valid keys obtained in S1-2 (S2-1). The display managing section 14 then deletes the display pattern data of invalid keys, from the display pattern data of all keys appearing in the standard state (S2-2), and the detection managing section 15 deletes the detection region data of the invalid keys, from the detection region data of all the keys appearing in the standard state. These steps S2-1 to S2-2 are performed with respect to each key. When this processing finishes with respect to all keys, the key loop processing routine finishes.

Before the aforesaid key loop processing is performed, the arrangements of the keys and detection regions correspond to those determined in S1-3 and S1-4 (note that, these arrangements correspond to the actual operation status). After the key loop processing is performed, these arrangements are caused to be in line with the arrangements of the keys and the detection regions determined in S2-2.

Then the order of priority of the valid keys selected by the operation managing section 13 is confirmed, and the information regarding the order of priority is supplied to the detection managing section 15. In response to this, in S3 through S10, the detection managing section 15 expands the detection regions of the valid keys over the key display regions of the invalid keys, in line with the order of priority of the valid keys, i.e. the valid key with the highest priority is expanded first, and the valid key with the lowest priority is expanded last.

Note that the order of priority of the keys may be determined in such a manner that the screen layout data contains display pattern data of the keys in a predetermined order of priority so that the display managing section 14 serially selects, out of the screen layout data, the display pattern data of the valid keys in accordance with the order of priority, or may be determined in such a manner that a priority data indicative of priority assigned to each key is recorded in the storage section 16 and the like, and the display managing section 14 serially selects the valid keys in reference to the results of comparison between each two values of priority data. The priority data may be preset. However, in consideration of the user-friendliness, the priority data preferably varies in line with usage frequency data that is rewritten in accordance with the usage history of the user.

The expansion of the detection regions in S3 through S10 is performed by the detection managing section 15. In S3, whether or not a target key is a valid key is checked. This step S3, however, is unnecessary in a case where the operation managing section 13 generates a list in which only valid keys are listed.

In S4, if the key display region of the target key has a compressed shape (a shape having a lengthwise dimension and a breadthwise dimension which are not equal), it is checked whether or not a vacant space exists beside the long side of the key display region, i.e. in the direction of the shorter axis of the key display region (shorter one of a lengthwise dimension and a breadthwise dimension of the key display region). This is because, if such a space exists in the direction of the shorter axis of the key display region, the detection region of the target key is expanded over the space, so that, as described above, a compression ratio of the detection region approaches to 1 and the shape of the detection region becomes resemble to a circle or square (here, the "compression ratio" denotes a ratio between a lengthwise dimension and a breadthwise dimension of a shape).

If, as a result of the checking in S4, the vacant space is found beside the long side of the key display region, the process proceeds to S5. If the space is not found, a valid key with the second highest priority is selected as a target key, and the steps S3 to S5 are performed again. This operation is looped until the processing with regard to the valid key with the lowest priority finishes.

In S5, as exemplified in FIG. 9(a), the key display region of an invalid button B exists, as a vacant space, beside the long side of the button E that is a target key. On this account, new detection region data is set in such a manner as to cause the detection region of the button E to be expanded over the key display region of the button B. The new detection region data may be set in such a way that the detection managing section 15 executes a program for generating the detection region data, or may be set in such a way that the detection managing section 15 selects, from a plurality of sets of detection region data, one of the sets of detection region data corresponding to a given condition.

With this, the detection region of the button E is approximately doubled in size. On this account, the selection of the button E is detected even when the selection by the user is not accurately performed.

Between S4 and S5, a step of checking the size of a vacant space may be interposed, taking into consideration a case that the vacant space found in S4 is narrow and not suitable for the expansion of the detection region. For instance, the detection managing section 15 allows the expansion when the distance between the edge of the key display region of the target key and the far side of the vacant space (in other words, a distance between a point on an edge of the key display region of the key and a certain point in the vacant region) exceeds a first threshold (corresponding to an upper threshold ThL described in Embodiment 2).

After the processing in S3 through S5 finishes with respect to all of the valid keys, a vacant space is sought in areas other than those areas beside the long sides of the target key. If such a space exists, the processing in S6 through S10 is performed so that the detection region is further expanded over that vacant space.

In S7 and S8, the detection region is expanded if a vacant space exists beside the short side of the target key (i.e. in the direction of the long axis (longer one of the lengthwise dimension and the breadthwise dimension of the detection region)). In S9 and S10, the detection region having been expanded over the vacant space beside the short side is further expanded if there is a vacant space beside the long side of the expanded detection region. Note that the processing in S6 is identical with the processing in S3, so that this processing can therefore be omitted.

As a result of the processing in S7 and S8, when no vacant space is found beside the long side of the button E (target key) in S4 and S5 but there is a vacant space beside the short side of the button E as exemplified in FIG. 9(b), the detection region of the button E can be expanded crosswise over that vacant space.

Moreover, in a case shown in FIG. 9(c), a vacant space is found beside the long side of the button E (target key) in S4 and S5 so that the detection region of the button E is expanded over that vacant space, and another vacant space corresponding to the button D exists beside the short side of the button E. On this account, in this case, the detection region can be further expanded over that space beside the short side.

According to the processing in S9 and S10, when the state of buttons shown in FIG. 9(c) is changed to the state shown in FIG. 9(d) so that the button A turns to invalid, the detection region of the button E can be obliquely expanded toward the button A. In this manner, after the expansions in S5, S8, and S10 are all performed, the detection region of the target key is expanded to a quadrangle that is approximately four times larger than the original detection region and has a compression ratio closer to 1 than the original detection region.

The processing in S6 to S10 is repeatedly performed with respect to all valid keys, in accordance with the order of priority of the keys. After the processing is performed with respect to all valid keys, the detection region setting processing finishes.

Figure 10:
FIG. 10(a) through FIG. 10(d) are explanatory views illustrating variations of enlarged key detection regions whose display regions are ellipsoids.
Figure 10:
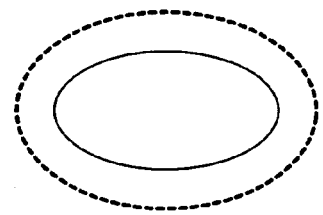
Figure 10:
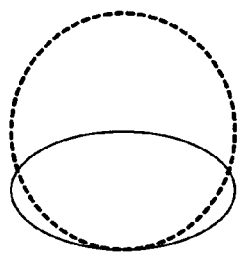
Figure 10:
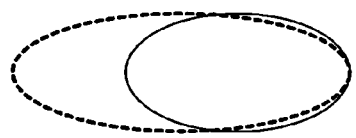
Figure 11:
FIG. 11(a) through FIG. 11(d) are explanatory views illustrating further variations of enlarged key detection regions whose display regions are ellipsoids.
Figure 11:
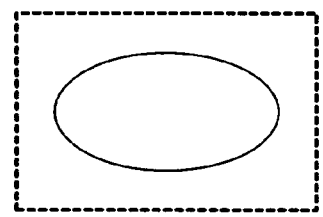
Figure 11:
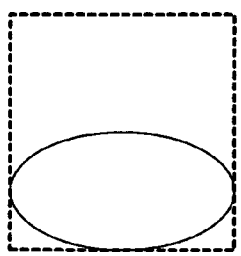
Figure 11:

FIGS. 10(a)–10(d) show variant examples of the key display region and the detection region corresponding thereto. FIG. 10(a) shows a case where the key display region is elliptical and long from side to side, and the shape and size of the detection region is identical with those of the key display region. Meanwhile, FIG. 10(b) shows a case where the detection region is expanded over a vacant space around the key display region, and the expanded detection region is identical in terms of shape with the original detection region.

FIG. 10(c) illustrates a case where the detection region is expanded over a vacant space existing in the shorter-axis direction of the key display region, in such a manner as to cause the compression ratio of the key display region to approach to 1, i.e. cause the key display region to have a circular shape. FIG. 10(d) shows a case where the detection region is expanded crosswise over a vacant space existing in the longer-axis direction of the key display region.

FIGS. 11(a)–11(d) show other variant examples of the key display region and the detection region corresponding thereto. In these examples, the detection region has a rectangular shape while the key display region has an elliptical shape. In these variant examples, the directions of expansion of those detection regions are identical with those in FIGS. 10(a)–10(d).

OPERATION EXAMPLE 3

Referring to a flowchart in FIG. 5, another example of the detection region setting processing will be discussed. In the flowchart in FIG. 4, when a vacant space exists adjacent to a valid key, new detection region data is set with respect to each valid key, in accordance with the order of priority. In the meanwhile, in the flowchart in FIG. 5, a vacant space adjacent to a valid key is searched and recorded in advance, and a set of detection region pattern data for utilizing the recorded vacant space is selected from predetermined sets of detection region pattern data. This processing is performed by the detection managing section 15.

Figure 5:
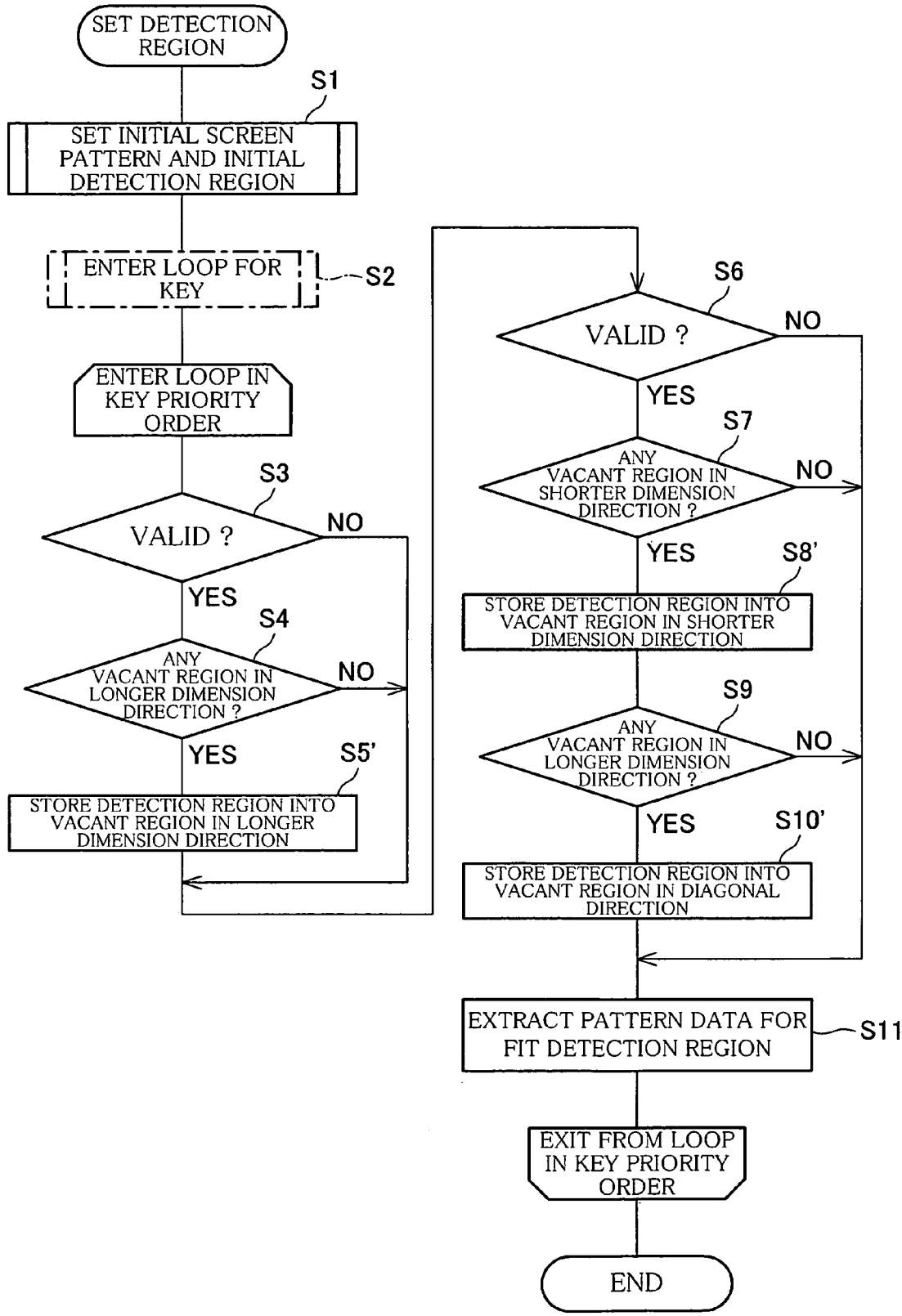
FIG. 5 is a flowchart illustrating another processing procedure according to the information processing method according to the present invention.

Accordingly, S5, S8, and S10 in the flowchart in FIG. 4 are replaced with S5', S8', and S10' in the flowchart in FIG. 5. Moreover, the processing in S11 is added in the flowchart in FIG. 5. Also, as the key loop processing performed in accordance with the order of priority of keys, the processing from S3 to S1 is looped. The following will discuss only on these dissimilarities.

In S5', if a vacant space (available space) exists beside the long side of the targeted valid key, information (coordinates information and the like) for specifying that vacant space is associated with the valid key and recorded. In S8', if an vacant space exists beside the short side of the targeted valid key, information (coordinates information and the like) for specifying that vacant space is associated with the valid key and recorded. Also in S10', if an vacant space exists in the oblique direction of the targeted valid key, information (coordinates information and the like) for specifying that vacant space is associated with the valid key and recorded.

In S11, a set of detection region pattern data for suitably utilizing the recorded vacant space for the expansion of the detection region is selected from predetermined sets of detection region pattern data. With this, the targeted valid key can utilize an adjacent vacant space, so that the detection region can be expanded so as to be larger than the key display region.

Repeating the processing in S3 through S11 in accordance with the order of priority of valid keys, it is possible to obtain the result identical with that of the detection region setting processing described in the flowchart in FIG. 4. Note that, in the flowchart in FIG. 5, the setting of the detection region is simplified by utilizing predetermined sets of detection region pattern data. On this account, as compared to the detecting region setting processing shown in the flowchart in FIG. 4, the load on the detection managing section 15 is reduced so that the processing speed is increased.

[Embodiment 2]

The following will describe another embodiment of the information processing device in accordance with the present invention and the information processing method executed on the information processing device in reference to drawings. Here, for convenience, identical elements are indicated by the same reference numerals and repeated description thereof is omitted.

Figure 12:
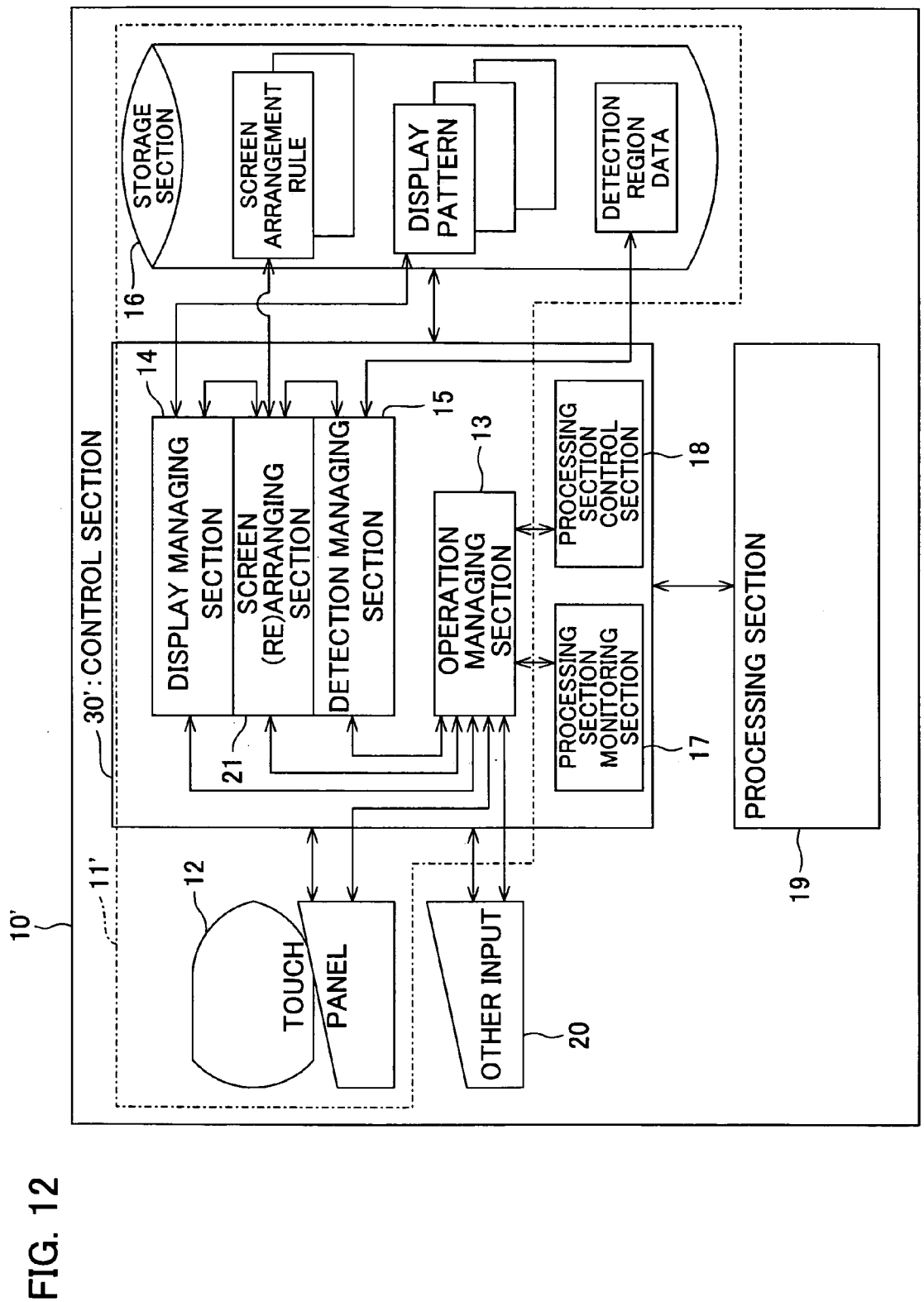
FIG. 12 is a block diagram illustrating another structure of the information processing device of the present invention, and an apparatus in which the information processing device is installed.

FIG. 12 is a block diagram illustrating, as an example, another arrangement of an image output device of the present invention and an information processing device contained in the image output device. The image output device carries out a process of recording an image on a storage medium. The present embodiment, for convenience, takes the aforementioned multifunction device as an example of as the image output device.

First of all, an information processing device 11' in a multifunction device 10' will be described. When compared with the aforementioned information processing device 11, the information processing device 11' of the present embodiment more dynamically carries out the process of changing the key arrangement and changing the size and position of the detection regions allocated to the respective keys in accordance with the key arrangement changing.

The processing by the aforementioned information processing device 11 is referred to as "more static" than the present embodiment. In the processing by the aforementioned information processing device 11, the key arrangement is fixed and changing of the detection regions is carried out in certain fixed manners (patterns) (see FIGS. 3(a) to 3(c)). Alternatively, in the processing by the aforementioned information processing device 11, the display positions, the allocated positions of the detection regions, etc. for the keys are changed by validating/invalidating the keys (see FIG. 8, FIGS. 9(a) to 9(f)). The display positions, the allocated positions of the detection regions, etc. of the keys do not therefore vary so much in embodiment 1 as in the present embodiment.

The following will describe an arrangement of the information processing device 11', focusing on differences from the information processing device 11. There are three differences: (i) The information processing device 11' contains a screen (re)arrangement section 21. (ii) The content of processing by the sections 13 to 15 differ due to the provision of the screen (re)arrangement section 21. (iii) Lastly, the storage section 16 stores screen arrangement rules in lieu of the aforementioned screen arrangement data.

The operation managing section 13 determines valid keys, and the number thereof, to be displayed on the screen in accordance with an operation status of the multifunction device 10'. The operation managing section 13 then sends the determined keys and number to the screen (re)arrangement section 21. The operation managing section 13 also sends information on the valid keys (or invalid keys where required) to the display managing section 14 and the detection managing section 15.

Figure 15:
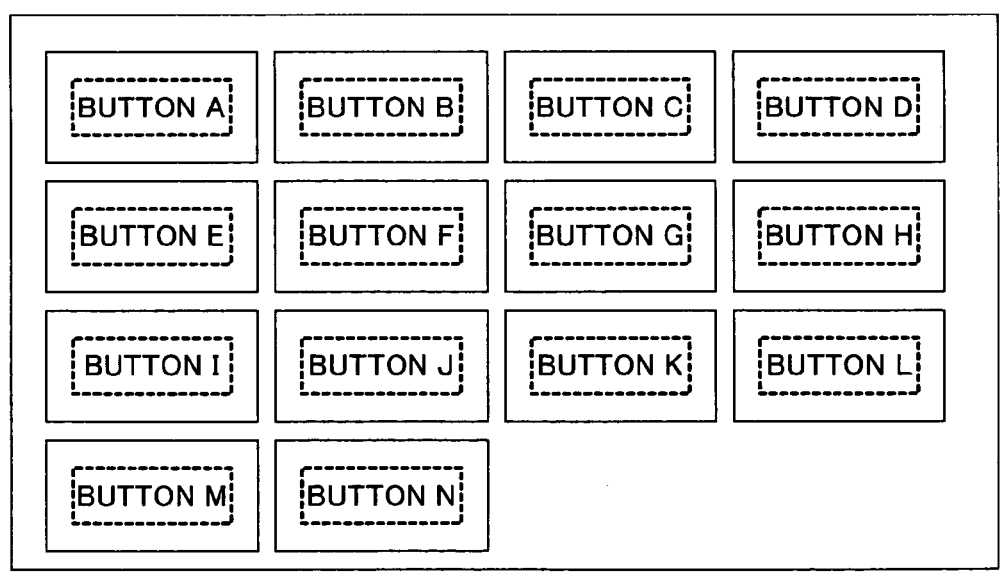
FIG. 15 is an explanatory view illustrating a state in which a detection region of each key has been reduced in response to a change in key layout as necessitated by an increased number of displayed keys.
Figure 16:
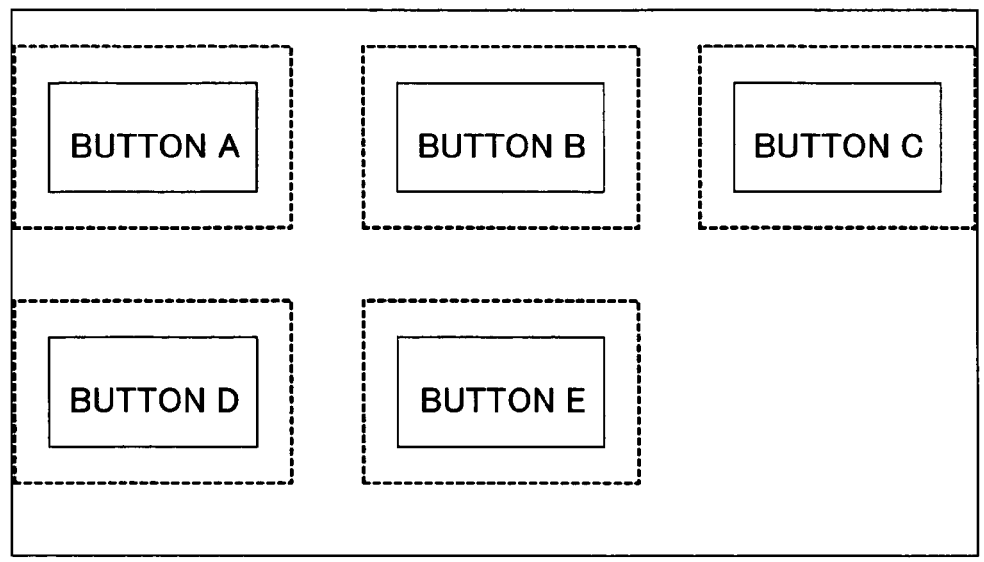
FIG. 16 is an explanatory view illustrating a state in which a detection region of each key has been enlarged in response to a change in key layout as necessitated by a reduced number of displayed keys.

The screen arrangement rules stored in the storage section 16 dictate how the valid keys should be arranged on the screen according to the number of valid keys to be displayed. The screen arrangement rules are determined in advance to stipulate that, for example, 6 or less valid keys should be displayed in 3 column by 2 row format as shown in FIG. 16, more than 12 valid keys in a 4-column-by-4—row format as shown in FIG. 15, and 10 to 12 valid keys in a 4 column by 3 row format. The rules may further stipulate that when an increased number of valid keys must be fitted in, the number of the valid keys arranged (aligned) in rows should be increased before the number of the valid keys arranged (aligned) in columns.

The screen arrangement rules may be given in the form of table data which correlates the number of keys with arrangement rules. Each arrangement rule may be associated with one key or a set of keys whose number is falls in a certain range.

The screen arrangement rules may be determined arbitrarily. Keys may appear in different sizes. Key sizes may be chosen first according to an operation status and later varied depending on, for example, usage frequency and importance. Also, the varied key sizes may be used as a basis on which the arrangement rules are changed.

Different operations of the multifunction device 10' of course call for different numbers and types of keys. For example, the sets of information registered in the multifunction device 10' as required may increase and decrease as is the case with the email addresses and telephone numbers of party with which the multifunction device 10' may communicate. Therefore, for example, when displaying an email address on the screen, the number of keys resepectively representing email addresses may increase and decrease. The information processing device 11' of the present invention is intended to deal with that variable number of keys in a flexible manner.

The screen (re)arrangement section 21 makes access to the storage section 16 to search for a screen arrangement rule which corresponds to the number of keys to be displayed as instructed by the operation managing section 13. In this situation, whether the screen (re)arrangement section 21 considers the operation status input from the operation managing section 13 depends on how the screen arrangement rule is determined, as mentioned earlier. The chosen arrangement rule is sent from the screen (re)arrangement section 21 to the display managing section 14 and the detection managing section 15.

The display managing section 14 reads display pattern data in the storage section 16 for those keys which match the valid key information received from the operation managing section 13. The display managing section 14 then generates key arrangement data giving an on-screen coordinate position for each key from the arrangement rules received from the screen (re)arrangement section 21, the display pattern data, and screen size data. Thus, a number of keys which matches the operation status are (re)arranged and displayed on the screen.

Meanwhile, the detection managing section 15 calculates distances between keys (hereinafter, "key-to-key distances"), because the key-to-key distances are variable depending on the number of keys. The key arrangement data produced by the display managing section 14 is also sent to the detection managing section 15. Supplied with the key arrangement data, the detection managing section 15 calculates how much to expand/shrink the detection regions in relation to the key display regions from the key-to-key distances. Specific ways of determining the detection regions will be detailed later.

The storage section 16 may store table data correlating the key-to-key distances with the expanding/shrinking of the detection regions as detection region data for later retrieval of information on the expanding/shrinking of the detection regions from the table data. For example, the table data correlates adjustment ratios (expansion/shrinkage ratios) respectively with vertical and horizontal key-to-key distances.

Alternatively, the table format may be discarded for a set of formulae (as detection region data) each being intended for a particular value or range of the key-to-key distance. The formulae stipulate that, for example, the detection region should be of the same size as the key display region for a certain key-to-key distance or expanded/shrunk by a specific value when the key-to-key distances exceeds a threshold.

In either case, the detection managing section 15 can obtain an adjustment ratio (expansion/shrinkage ratio) for each key-to-key distance by checking the distances separating a target key from its vertical and horizontal neighbors. Therefore, the detection regions can be specified which are expanded/shrunk in a suitable manner relative to the target key display regions.

The screen arrangement data described in reference to FIG. 2 can be associated with one set of screen arrangement rules. However, calculating the key-to-key distances for adjustment ratios (expansion/shrinkage ratios) provides greater flexibility and realizes suitable displays in varieties of cases.

These operation managing section 13, display managing section 14, a detection managing section 15, processing section monitoring section 17, processing control section 18, and screen (re)arrangement section 21 constitute a control section 30' of the multifunction device 10'. The control section 30' can be arranged from a CPU and a computer program executing the actions of the sections 13 to 15, 17, 18, 21.

Figure 13:
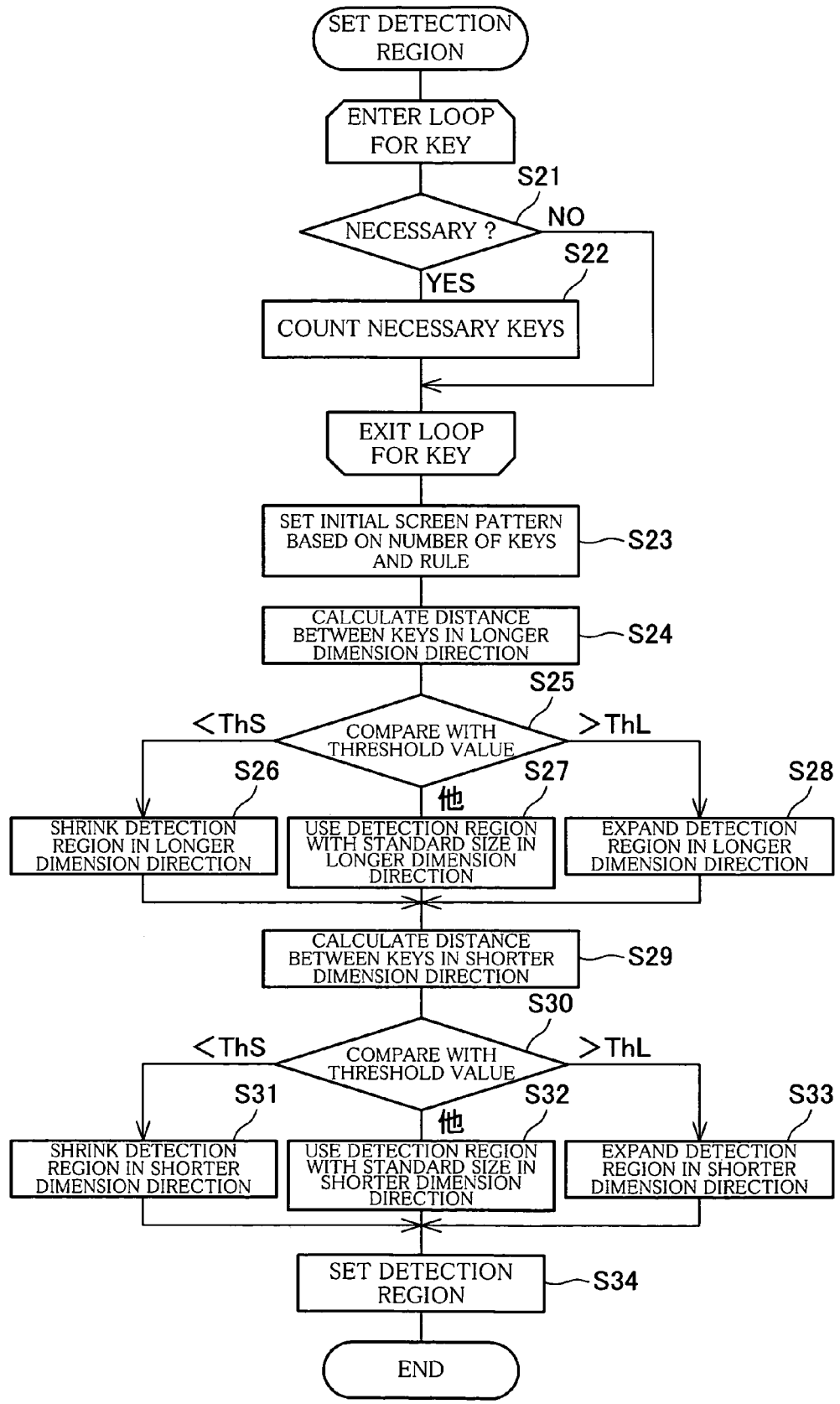
FIG. 13 is a flow chart illustrating yet another processing procedure according to the information processing method of the present invention.

Now, the operation of the information processing device 11' arranged as above will be described in reference to a flow chart in FIG. 13.

The detection region setting process is started when the multifunction device 10' has reached an operation state.

First, a key loop (loop for key) (S21, S22) is carried out (entered) to check which keys are required for the current operation status. If information identifying required keys, i.e. valid keys, is stored in advance in association with the operation status, however, the operation managing section 13 only needs to retrieve the information for a transfer to the display managing section 14 and the detection managing section 15; the key loop can therefore be replaced by the information transfer process.

To carry out (enter) the key loop, the operation managing section 13 first checks one key at a time whether the registered keys are valid keys in S21. If they are valid keys, the operation managing section 13 counts up in S22. As S21 and S22 are finished for all the keys, the operation exits the key loop and proceeds to S23.

Figure 14:
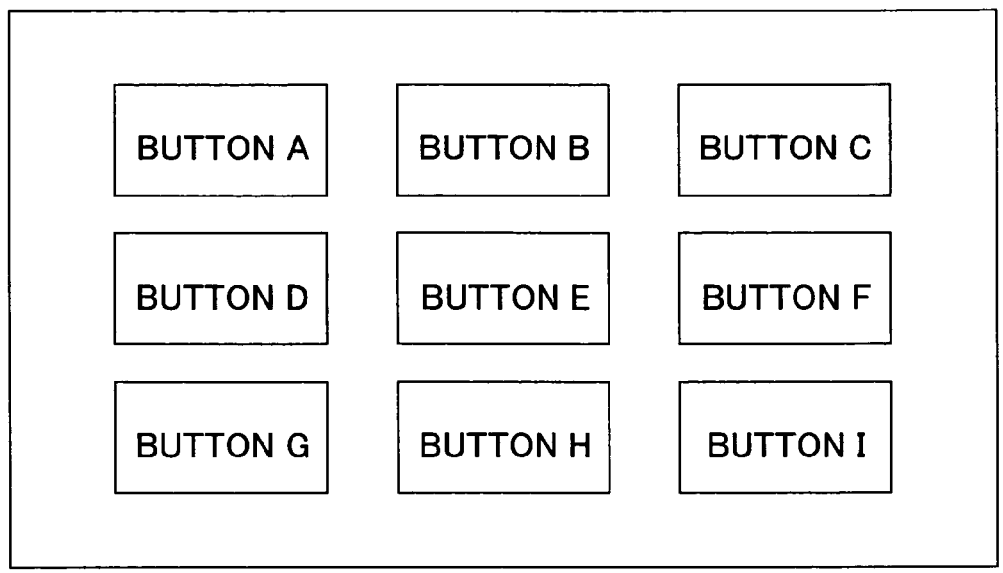
FIG. 14 is an explanatory view illustrating a state in which key display regions and key detection regions coincide, with the number and order of keys being in an initial state.

In S23, the screen (re)arrangement section 21 chooses a suitable set of screen arrangement rules for the number of valid keys (or operation status where necessary) supplied from the operation managing section 13. The display managing section 14 and the detection managing section 15 restores the valid key display region and the detection region to their initial settings. FIG. 14 shows initial settings for buttons A to I (valid keys) where the key display regions match the detection regions.

Subsequently, where the valid key display regions have a compressed shape as in FIG. 14, the detection managing section 15 in S24 calculates a distance between longer sides of adjacent valid keys (hereinafter, "longer-side key-to-key distance"). An exemplary calculation is given: The numbers of rows and columns are determined from the screen arrangement rule and the number of valid keys. Also, the vertical and horizontal sum lengths taken up by the valid keys are determined from the size of the valid key display regions and the numbers of rows and columns. Subtracting these sum lengths from the vertical and horizontal lengths of a key display range on the screen gives vertical and horizontal sum margins (sum of margins). Then, the vertical margin (or the horizontal margin) is divided by (the number of rows (or columns)-1). This calculation gives the vertical and horizontal key-to-key distances between equally distanced valid keys.

The key-to-key distances can again be calculated in advance in relation to the screen arrangement rules and retrieved from a memory, instead of the direct calculation.

Next, in S25, the detection managing section 15 compares the longer-side key-to-key distance with an upper threshold ThL (the first threshold) and a lower threshold ThS (the second threshold).

If the comparison shows that the longer-side key-to-key distance is less than the lower threshold ThS, the key-to-key distance is too short. The detection managing section 15 therefore gives priority to the prevention of erroneous detections and calculates a shrink ratio at which the detection regions are shrunk in a direction of a short axis of the key (S26). Alternatively, the shrink ratio may be predetermined in relation to the lower threshold ThS so that the detection managing section 15 can retrieve the shrink ratio from a memory.

In contrast, if the longer-side key-to-key distance is more than the upper threshold ThL, the key-to-key distance is long enough. The detection managing section 15 therefore gives priority to high key selectability and calculates an expand ratio at which the detection regions are expanded in a direction of a short axis of the key (S28). Alternatively, the expand ratio may also be predetermined in relation to the upper threshold ThL so that the detection managing section 15 can retrieve the expand ratio from a memory.

If the longer-side key-to-key distance is between the lower threshold ThS and the upper threshold ThL inclusive, the distance is within a standard range. The detection managing section 15 therefore retain the detection regions in their initial settings. That is, the adjustment ratio (expansion/shrinkage ratio) is set to 1 (S27).

In subsequent S29 to S33, the detection managing section 15: calculates a distance between shorter sides of adjacent valid keys (hereinafter, "shorter-side key-to-key distance"); compares the shorter-side key-to-key distance with a lower threshold ThS and an upper threshold ThL which are either for sole use with the shorter-side key-to-key distance or commonly used for both the shorter- and longer-side key-to-key distances; and calculates an adjustment ratio (expansion/shrinkage ratio) in a direction of a long axis of the key similarly to the foregoing. The ratio is calculated the same way as in S24 to S28. No repeated description is given here.

The initial vertical and horizontal lengths of the detection regions are then multiplied respectively by the adjustment ratios (expansion/shrinkage ratios) in the short axis direction and the long axis direction which are obtained in the above process. The initial sizes of the detection regions are changed accordingly (S34).

There are no limitations on the order of the adjustment ratio (expansion/shrinkage ratio) setting processing (S24 to S28) in the short axis direction and the adjustment ratio (expansion/shrinkage ratio) setting processing (S29 to S33) in the long axis direction. The processes may be performed in such a manner that the steps S29 to S33 are performed before the steps S24 to S28.

When there are involved large numbers of valid keys (buttons A to N), the above operation results in reducing both the longer- and shorter-side key-to-key distances of each valid key. See, for example, FIG. 15: the detection regions are indicated by broken lines. The detection region of each valid key is shrunk relative to the key display region. Hence, the information processing device can produce a crammed on-screen display of large numbers of valid keys, while preventing erroneous detections that would be otherwise caused by the user's fingers or the like touching both an intended valid key and its adjacent valid key.

Conversely, when a small number of valid keys (buttons A to E) are involved, the above operation results in increasing both the longer- and shorter-side key-to-key distances of each valid key. See, for example, FIG. 16: the detection regions are indicated by broken lines. The detection region of each valid key is expanded relative to the key display region. Hence, the information processing device can produce a sparsely populated on-screen display of a small number of valid keys. This allocates an increased detection region to each valid key, thereby ensuring safe detection of a selected valid key even in careless manipulation.

Figure 17:
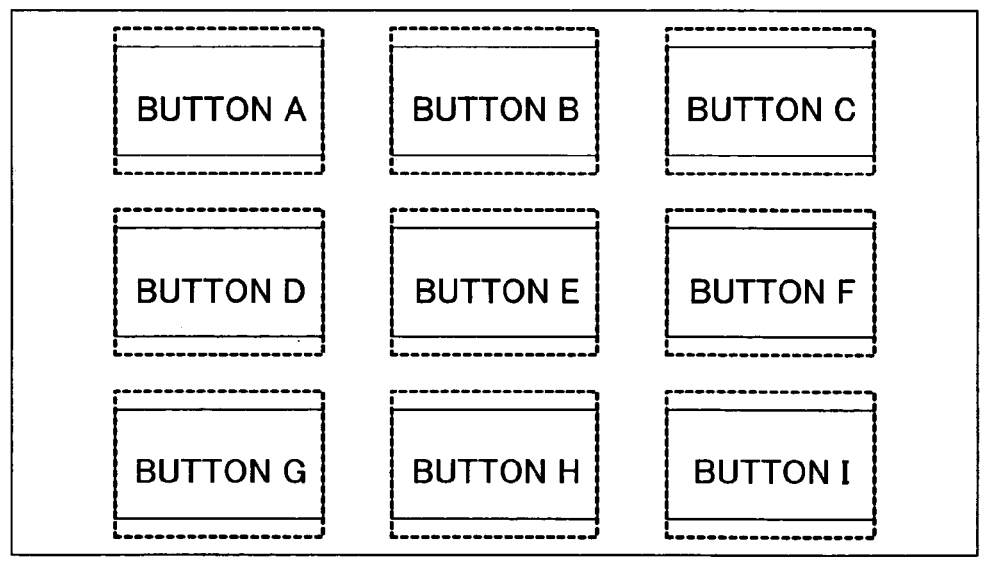
FIG. 17 is an explanatory view illustrating an example in which detection regions of keys whose display regions are rectangular have been enlarged to be squares.

FIG. 17 shows an example where the length of each valid key in the short axis direction has been solely expanded. This is intended to bring the compression ratio of the detection region as close to 1 as possible (reshape a rectangle or elliptical to a square or circle). To achieve this, additional steps are needed in the flow chart in FIG. 13, for example, immediately prior to S34. One of the steps calculates the vertical and horizontal lengths of the detection region from the obtained adjustment ratio (expansion/shrinkage ratio) to calculate the vertical and horizontal ratio (compressiveness ratio) of the detection region. The other step sets the vertical and horizontal lengths of the detection region to new values based on the calculated compression ratio.

Figure 18:
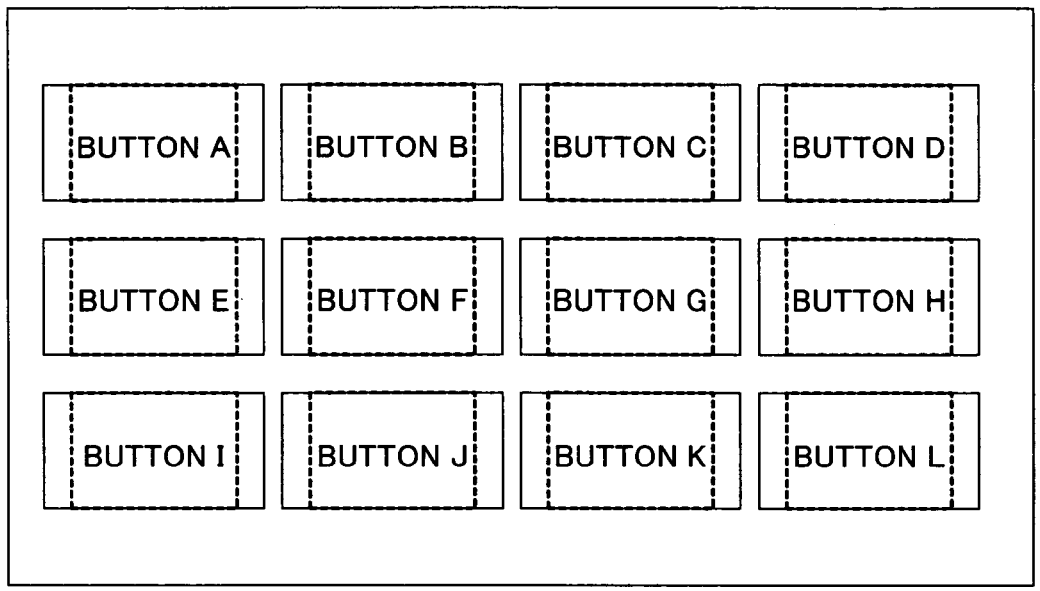
FIG. 18 is an explanatory view illustrating an example in which detection regions of keys whose display regions are rectangular have been reduced to be squares.

FIG. 18 shows an example where the initial detection regions have been shrunk in the long axis direction. In this example, the adjustment ratio (expansion/shrinkage ratio) for the key display regions is fixed at 1 in the short axis direction and limited to 1 or less in the long axis direction.

Figure 19:
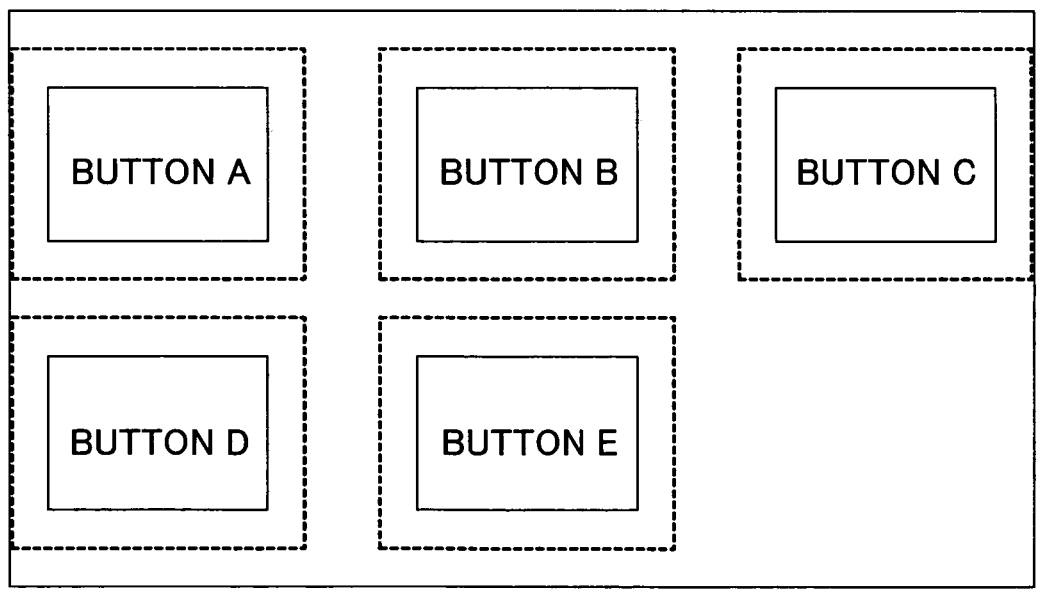
FIG. 19 is an explanatory view illustrating an example in which a display region of each key has been enlarged in response to the enlargement of the detection region.

FIG. 19 shows an example where not only the detection regions have been expanded in both the vertical and horizontal directions as in FIG. 16, but the key display regions of the valid keys (buttons A to E) have been also expanded. To achieve such an expansion of the key display regions, additional steps are needed in the flow chart in FIG. 13, for example, immediately following S34. One of the steps determines an expand ratio for the key display region based on the expand ratio for the detection region. The other step multiplies the determined expand ratio by the initial vertical and horizontal lengths of the key display regions so as to reset the lengths to new values.

It is preferable to set the expand ratio for the key display region so that the expanded key display region is smaller than the expanded detection region as shown in FIG. 19, rather than to match the expanded detection region to the expanded key display region. When the key display region is smaller than the detection region, the user is more likely to select near a center of the detection region, because the user can see only the key display region, not the detection region. Put differently, when he is to touch an edge of the detection region, the user is less likely to touch an adjacent detection region and cause an erroneous detection.

As such, even when the number of keys is arbitrarily changed based on the operational status of the MFP 10' or the user's usage status, the information processing device 11' of the present invention can flexibly deal with such a change in the number of the keys. This optimizes balance between the effect of preventing erroneous detection and the effect of selecting keys with ease.

Note that, in cases where the size of the key display region of the key and the size of the screen displaying the key are fixed, an interval between the keys can be determined according to only the screen arrangement rule. Finally, the following explains a rule (key arrangement adjustment rule) of adjusting the key arrangement when increasing the number of the valid keys displayed on the screen.

In cases where each key display region of the keys has a compressed shape, reservation of the long length side key intervals may be prior to reservation of the short length side key intervals in view of key touch easiness (selection easiness). For this reason, it is preferable to make such an arrangement adjustment rule that the number of the keys are increased in the long axis direction with narrow short length side key intervals.

For example, see how the arrangement adjustment rule is made in cases where the number of the valid keys is increased from (i) nine (valid keys arranged in 3 rows by 3 columns as shown in FIG. 17) to (ii) twelve. In this case, the arrangement adjustment rule is not made such that the keys are arranged in 4 rows by 3 columns with narrow intervals in the short axis direction, but is made such that the keys are arranged in 3 rows by 4 columns with narrow intervals in the long axis direction as shown in FIG. 18. When the keys are arranged in 4 rows by 3 columns with such narrow intervals in the short axis direction, the increase in rows causes the detection region to be further compressed, for example, as shown in FIG. 15. In contrast, as shown in FIG. 18, the key arrangement of 4 rows by 3 columns secures a desirable short-axis-direction length of the detection region, and allows the detection region to be more like a square shape. This ensures selection easiness for the user.

(a) The method according to the present invention for processing information is preferably arranged to include: (i) in case where a plurality of the keys are to be displayed on the screen, and (ii) when a distance across a key-sandwiched invalid region between edges of the key display region and another key display region is less than a second threshold value where the second threshold value is smaller than the first threshold value, generating, by the information processing device, detection region data that defines an extent of the detection region with respect to dimensions of the key display region so that the detection region becomes smaller than the key display region.

In case of displaying a plurality of keys in the screen, as key display regions are closer to each other, a detection region of a key adjacent to a key which is to be selected by the user is more likely to cause erroneous detection. When the foregoing distance is smaller than a second threshold value smaller than the first threshold value in an invalid region formed between keys, detection regions adjacent to each other are too close to each other. Thus, the information processing device generates detection region data which defines an extent of the detection region on the basis of a dimension of the key display region so that the detection region is smaller than the key display region.

On this account, the detection region is smaller than the key display region, so that it is possible to expand an interval between detection regions. As a result, it is possible to prevent a key selected by the user from being erroneously detected by an adjacent detection region.

Further, according to the information processing method of the present invention, it is possible to optimize a balance between an effect of realizing easier key selection and an effect of preventing erroneous detection, in accordance with a dimension of an invalid region formed adjacent to a key.

(b) The information processing device may be configured so that in case where a plurality of the keys are to be displayed on the screen, the detection managing section updates positional data of detection regions of the keys so that the extent of the respective detection regions of the keys are adjusted in accordance with key arrangement of the keys, the key arrangement determined by the operation managing section.

On this account, it is possible to set an extent of each key detection region depending on key arrangement of plural keys, so that it is possible to optimize a balance between an effect of realizing easier key selection and an effect of preventing erroneous detection, depending on the key arrangement of plural keys.

(c) The information processing device may be configured so that (i) in case where a plurality of the keys are to be displayed on the screen, and (ii) when key arrangement of the keys on the screen is changed by the operation managing section so as to delete or invalidate a key that becomes unnecessary as a result of a change in an operation status of the apparatus, the key arrangement corresponding to the operation status, the detection managing section updates the positional data of the detection region so that the extent of the detection region is extended by utilizing a key display region of the key having been deleted or invalidated.

According to the foregoing configuration, in case where a certain key is not required due to variation (change) of the operation status, the key is deleted or invalidated and consequently, a region displaying the key is changed into a not-detectable region which does not allows the user to select. Thus, the not-detectable region, i.e., a key display region deleted or invalidated becomes a region suitable for extension of a detection region of other valid key.

Thus, the detection managing section updates positional data of the detection region so as to expand the extent of the detection region by using the not-detectable region, so that it is possible to realize easier key selection depending on the operation status.

Note that, such a configuration is suitable particularly for such a mode that: key arrangement of plural keys is fixed, and display of a necessary key is validated and display of an unnecessary key is changed from valid display into invalid display depending on an operation status at each time.

The information processing device may be configured so as to include a display managing section for determining a position at which the key is displayed in the screen, wherein: in case where a plurality of keys, at least one of which is the key, are to be displayed, when the key arrangement of the keys is changed so as to delete or invalidate a key that becomes unnecessary as a result of a change in operation status, the operation managing section obtains vacancy information concerning a display position of the key having been deleted or invalidated from the display managing section, and the detection managing section updates the positional data of the detection region so that the extent of the detection region is expanded by utilizing a key display region of the key having been deleted or invalidated, in accordance with the vacancy information inputted from the operation managing section.

(d) Further, the information processing device may be configured so that the detection managing section accesses to a storage section, reads out therefrom pattern data that corresponds to the key arrangement determined by the operation managing section, and updates the positional data of the detection region in accordance with the pattern data thus read out, the storage section storing therein a plurality of pieces of pattern data for respective patterns that respectively correspond to different arrangements of the detection regions on the screen.

On this account, the detection managing section updates the positional data of the detection region by utilizing the pattern data indicative of a layout of detection regions. Thus, compared with such a process that positional data of detection regions are sequentially calculated for each key, it is possible to reduce a processing load of the detection managing section, and it is possible to reduce a time taken to perform the processing.

(e) Further, the information processing device may be configured so as to include a display managing section for determining a display position of the key on the screen, the detection managing section acquiring information of a vacant region around a target key, the information derived from the display position thus determined by the display managing section, and updating the positional data of a detection region of the target key in accordance with the information of the vacant region so that the detection region of the target key is expanded into the vacant region.

According to the foregoing arrangement, the display managing section determines a position at which a key is displayed in the screen, so that it is possible to retain or derive information regarding a position of a region which does not display a key in the screen, that is, information of the vacant region. Note that, a process for deriving the information of the vacant region may be carried out by any of the display managing section, the operation managing section, and the detection managing section.

When there is a vacant region around the target key, the detection managing section expands the detection region by utilizing the vacant region, so that it is possible to effectively utilize the vacant region, thereby realizing easier selection of the target key.

It is not necessary that the vacant region is adjacent to the target key with the target key entirely surrounded by the vacant region. As long as the vacant region is partially adjacent to the target key, the vacant region can be utilized to expand the detection region.

(f) Further, it is preferable to configure the information processing device so that in case where the detection region of the target key has a shape having a lengthwise dimension and a breadthwise dimension which are not equal, the detection managing section updates the positional data of the detection region so that a compression ratio of the detection region of the target key becomes close to 1.

In case where the detection region of the target key has a compressed shape, i.e., the shape having a lengthwise dimension and a breadthwise dimension which are not equal, it is possible to expand or reduce the detection region so as to have more compressed shape. However, when the detection region is expanded or reduced so as to have a shape similar to a circle or a square, it is easier for the user to select the region. Thus, it is preferable that a compression ratio of the detection region of the target key is made close to 1.

(g) Further, it is preferable to arrange the information processing device so that in case where the detection region of the target key has a shape having a lengthwise dimension and a breadthwise dimension which are not equal, the detection managing section updates the positional data of the detection region so that expansion of the key display region into a vacant region located in shorter one of the lengthwise dimension and the breadthwise dimension is given priority over expansion of the key display region into a vacant region located in longer one of the lengthwise dimension and the breadthwise dimension.

On this account, when the detection region is expanded into a vacant region located in a shorter dimension of the key display region, the compression ratio of the detection region is more likely to be close to 1, so that it is possible to realize easier key selection as described above.

(h) Further, the information processing device may be configured so that the detection managing section acquires information of vacant regions in such a manner that (A) the detection managing section firstly acquires (i) information of a vacant region toward a first direction with respect to the key display region of the target key, and (ii) information of a vacant region toward a second direction with respect to the key display region, the second direction crossing with the first direction, and (B) if there are the vacant regions toward both the first direction and the second direction with respect to the key display region, the detection managing section further acquires (iii) information of a vacant region toward a direction between the first direction and the second direction with respect to the key display region (here, for example, the first direction is a direction along the shorter one of the lengthwise dimension and breadthwise dimension, meanwhile the second direction is a direction along the longer one of the lengthwise dimension and breadthwise dimension).

In case where there are vacant regions in both the first and second directions with respect to the key display region of the target key, the detection region is expanded toward the vacant regions in both the directions. However, when it is possible to expand the detection region also in a direction between the first and second directions, it is possible to reduce unevenness in a shape of the detection region, so that it is possible to realize easier key selection. Thus, in this view point, it is preferable that the detection managing section further obtains information of the vacant region in the direction between the first and second directions as described above.

(i) Further, it is preferable to arrange the information processing device so that in case where a plurality of the keys are to be displayed on the screen, the operation managing section gives, to the detection managing section, information regarding priority order for the keys; and the detection managing section updates positional data of detection regions of the keys in accordance with the priority order.

The priority order for the keys can be determined in accordance with usage frequency, importance in the operation of the device, or a setting of the user. It may be so configured that such priority order is compiled and recorded by the operation managing section or it may be so configured that priority order corresponding to an operation status is predetermined and memorized, or it may be so configured that the user sets the priority order as required.

According to the foregoing configuration, a more highly prioritized key is more preferentially expanded or reduced, so that it is possible to preferentially optimize a balance between an effect of realizing easier selection of a more highly prioritized key and an effect of preventing erroneous detection. Thus, it is possible to improve the operation quality of the device.

(j) Further, the information processing device may be arranged so that in case where a plurality of the keys are to be displayed on the screen, the detection managing section calculates out a distance between the keys, from a size of the screen and that key arrangement on the screen which the detection managing section determines and, and updates positional data of the detection region on the screen so that the extent of the detection region are in accordance with the distance thus calculated out.

As described above, arrangement and the number of keys in the screen change depending on an operation status of the device. Thus, when a plurality of keys are disposed in the screen, a distance between the keys may change according to the operation status of the device. In this case, when the distance between the keys is large, it is preferable that: a region therebetween is utilized so as to expand each detection region, thereby realizing easier key selection. Further, when the distance between the keys is small, it is preferable that: each detection region is reduced so as to further separate the detection regions from each other, thereby improving the effect of preventing the erroneous detection.

According to the foregoing arrangement, it is possible to optimize a balance between an effect of realizing easier key selection and an effect of preventing erroneous detection, in accordance with the distance between the keys which changes depending on the operation status. Thus, it is possible to provide the information processing device which processes information according to the operation status of the device more dynamically and more flexibly.

(k) Further, the information processing device may be arranged so that a display managing section for determining display status of the key on the screen, the display managing section expanding the detection region of the key in accordance with expansion of the extent of the detection region by the detection managing section.

On this account, in case where it is possible to expand the detection region, the display managing section expands the key display region, so that a key can be made easier to see and easier key selection can be realized.

(l) Further, the information processing device may be configured so as to include: a display managing section for determining display status of the key on the screen, in case where, as a result of a change in an operation state of the information processing device, the operation managing section determines to increase a number of the keys to be displayed on the screen so that the number of the keys becomes greater after the change in the operation state than before, and in case where key display regions of the keys have a shape (or shapes) having a lengthwise dimension and a breadthwise dimension which are not equal, the display managing section determines the display status so as to increase a number of those ones of the keys which are arranged along a direction associated with longer one of the lengthwise dimension and breadthwise dimension.

In case of increasing the number of keys according to change of the operation status, when the key display region has a compressed shape and the number of regions disposed in the short axis direction is increased, the key display region is highly likely to be compressed in the short axis direction. This causes the key display region to have a further compressed shape, so that also the detection region is required to have a compressed shape. As a result, it is difficult to select a key.

When the number of disposed keys is increased in the long axis direction of the key display region, it is possible to reduce a possibility that the key display region and the detection region are compressed in the short axis direction.

(m) An image output device according to the present invention is a device including an information processing device for processing information, the information processing device comprising a screen for displaying at least one key that is selectable by touching the screen or locally approaching the screen, and a detection region in which selecting of the key is detectable, the information processing device including: an operation managing section for determining key arrangement on the screen in accordance with operation status of an apparatus to which the information processing device is provided; and a detection managing section for updating positional data of the detection region on the screen so that an extent of the detection region is adjusted in accordance with the key arrangement thus determined by the operation managing section, the image outputting device recording an image on a recording medium in accordance with an instruction outputted from the information processing device according to a key selected.

On this account, it is possible to give a necessary instruction to the image output device via the information processing device of the present invention which changes the key arrangement and the detection region that are displayed in the screen according to an operation status of the image output device serving as the aforementioned device. Thus, it is possible to provide the image output device which optimizes a balance between an effect of realizing easier key selection and an effect of preventing erroneous detection.

Particularly, in case where the image output device is a multifunction device such as MFP and a digital copying machine, the key arrangement variously changes due to (i) a large number of screens, (ii) whether or not any option/supply is provided with the device, (iii) a processing condition, and (iv) an operation condition. Thus, it is extremely effective to perform a process of expanding/reducing the detection region as required.

(n) An information processing program according to the present invention causes a computer to execute the information processing method, or causes a computer to function as the information processing device.

Further, a recording medium according to the present invention is a recording medium in which the information processing program is stored.

On this account, the information processing program of the present invention is loaded from the recording medium or a transmission medium to a computer, so that it is possible to cause the computer to carry out the information processing method which realizes the aforementioned effect and it is possible to cause the computer to function as the information processing device which realizes the aforementioned effect.

Note that, a combination of an arrangement recited in a noted claim and an arrangement recited in other claim is not limited merely to a combination of the arrangement recited in the noted claim and an arrangement recited in claim dependent from the noted claim. As long as it is possible to achieve the object of the present invention, it is possible to adopt a combination of the arrangement recited in the noted claim and an arrangement recited in claim which is not dependent from the noted claim.

Note that the display operation device of the present invention may be arranged as follows:

(1) A display operation device in which a display device and a coordinates input device are incorporated, wherein: a size of a detection region of a key to be displayed is adjustable according to a size of the key.

(Effect: Prevention of erroneous detection and an easy operation are ensured by adjusting the size of the detection region according to a selected screen or a selected processing status while the size of the key is not changed.)

(2) The display operation device as set forth in (1), wherein: the size of the detection region is dynamically adjusted in response to deletion or invalidation (deactivation) of an unnecessary key.

(Effect: With this, it is always possible to set the detection region so that it allow an optimal easy operation.)

(3) The display operation display as set forth in (1) wherein: the detection region is expanded to a vacant region (invalid region) on periphery of each of target keys.

(Effect: Even when the vacant region is available not all around the target key, a small vacant region on the periphery can be effectively used.)

(4) The display operation device as set forth in (3), wherein: the detection region expands preferentially to the vacant region positioned in a direction of a long length side of the target key (in a short axis direction).

(Effect: This makes it easier for the user to touch the detection region.)

(5) The display operation device as set forth in (3), wherein: an expansion of the detection region in an oblique direction is attempted only when the detection region is allowed to expand lengthwise and widthwise.

(Effect: This makes it easier for the user to touch the detection region.)

(6) The display operation device as set forth in (3), wherein: the expansion of the key display region is carried out in an order from a key given a highest priority to a key given a lowest priority.

(Effect: This makes it easier for the user to touch important keys such as frequently used keys and keys for important operations.)

(7) An image processing device including the display operation device as set forth in (1).

(Effect: A multifunctional image processing device such as an MFP and a digital copying machine has many screens, and a key arrangement in the image processing device is variously adjusted based on presence or absence of options and supply goods; a processing status; and an operation status. For this reason, the adjustment of the detection region is very beneficial.)

(8) A method for controlling a display operation device in which a display device and a coordinates input device are incorporated, the method including the steps of: recognizing a vacant region on the periphery of each of target keys; and expanding a detection region toward the vacant region.

(9) The display operation device as set forth in (1), wherein: the size of the detection region is dynamically adjusted based on a distance between keys, the distance being found based on a key arrangement determined (in accordance with a predetermined rule) by summing up display amounts of necessary keys.

(10) The display operation device as set forth in (1), wherein: in cases where a small number of keys are arranged, a key pattern is expanded in a direction of a long length side of each key (in a short axis direction).

(11) The display operation device as set forth in (1), wherein: in cases where a large number of keys are arranged, the keys are so arranged that the keys have narrow intervals in a direction of a short length side of each key (in a long axis direction).

(12) A method for controlling the display operation device as set forth in (9).

(13) A program causing a CPU to execute the control method as set forth in (8) or (12).

(14) A storage medium storing the program as set forth in (13).

The present invention is not limited to the embodiments above, but may be modified within the scope of the following claims. An embodiment based on a proper combination of technical means disclosed in different embodiments is encompassed in the technical scope of the present invention.

Further, it is needless to say that the object of the present invention can be achieved also by: (i) providing, in the system or the device, a storage medium that stores a software program code for realizing the aforementioned functions of Embodiments, and (ii) causing the system or a computer (CPU, or MPU (micro processing unit)) of the device to read out and execute the program code stored in the storage medium.

In this case, the program code read out from the storage medium realizes the functions, and hence the storage medium that stores the program code is a component of the present invention.

Examples of the storage medium for supplying the program code include: a floppy disk, a hard disk, an optical disc, an optical magnetic disc, a magnetic tape, a non-volatile memory card, and the like.

Further, the program code may be downloaded from another computer system to a memory section of a terminal via a transmission medium such as a communication network.

Needless to say, the present invention encompasses: a case where the functions of Embodiments are realized by executing the program code read out by the computer; and a case where the functions of Embodiments are realized by processing that is partially or wholly carried out, by an OS (operating system) operating in the computer, in accordance with an instruction of the program code.

Needless to say, the present invention further encompasses a case where the functions of Embodiments are realized by processing which is partially or wholly executed by a CPU, provided in a function extension board inserted in the computer or provided in a function extension unit connected to the computer, in accordance with the program code that is read out from the storage medium and is written in a memory provided in the function extension board or the function extension unit.

In cases where the present invention is applied to the storage medium, the program code that corresponds to the flowcharts explained above is stored in the storage medium.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A method for processing information that defines a dimension of a detection region of a key displayed on a screen of an information processing device, where the detection region is adjacent to an invalid region, the detection region being a region in which touching of the screen in this region or local approaching to this region is detectable, and the invalid region being a region in which the touching of the screen in this region or local approaching to this region is not detectable, the method comprising:
when a distance across the invalid region from an edge of a key display region exceeds a first threshold value,
generating, by the information processing device, a detection region data that defines an extent of the detection region with respect to a dimension of the key display region so that the detection region becomes larger than the key display region by utilizing the invalid region.

2. A method as set forth in claim 1, comprising:
in case where a plurality of the keys are to be displayed on the screen,
when a distance across a key-sandwiched invalid region between edges of the key display region and another key display region is less than a second threshold value where the second threshold value is smaller than the first threshold value,
generating, by the information processing device, detection region data that defines an extent of the detection region with respect to dimensions of the key display region so that the detection region becomes smaller than the key display region.

3. An information processing device for processing information, the information processing device comprising a screen for displaying at least one key that is selectable by touching the screen or locally approaching the screen, and a detection region within which selecting of the key is detectable, the information processing device comprising:
an operation managing section for determining a key arrangement on the screen in accordance with an operation status of an apparatus to which the information processing device is provided; and
a detection managing section for updating positional data of the detection region on the screen so that an extent of the detection region is adjusted in accordance with a spatial density of the key arrangement determined by the operation managing section.

4. An information processing device as set forth in claim 3, wherein:
in a case where a plurality of keys are to be displayed on the screen,
the detection managing section updates positional data of detection regions of the keys so that the extent of the respective detection regions of the keys are adjusted in accordance with a spatial density of the key arrangement determined by the operation managing section.

5. An information processing device as set forth in claim 3, wherein:
in a case where a plurality of keys are to be displayed on the screen, and
when the key arrangement of the keys on the screen is changed by the operation managing section such that a key that has become unnecessary as a result of a change in an operation status of the apparatus is deleted or invalidated,
the detection managing section updates the positional data of the detection region of the active keys so that the extent of the detection region is extended by utilizing a key display region of the key having been deleted or invalidated.

6. An information processing device as set forth in claim 3, wherein:

the detection managing section accesses to a storage section, reads out therefrom pattern data that corresponds to the key arrangement determined by the operation managing section, and updates the positional data of the detection region in accordance with the pattern data thus read out, the storage section storing therein a plurality of pieces of pattern data for respective patterns that respectively correspond to different arrangements of the detection regions on the screen.

7. An information processing device as set forth in claim 3, comprising:

a display managing section for determining a display position of the key on the screen, the detection managing section acquiring information of a vacant region around a target key, the information derived from the display position thus determined by the display managing section, and updating the positional data of a detection region of the target key in accordance with the information of the vacant region so that the detection region of the target key is expanded into the vacant region.

8. An information processing device as set forth in claim 7, wherein:

in case where the detection region of the target key has a shape having a lengthwise dimension and a breadthwise dimension which are not equal, the detection managing section updates the positional data of the detection region so that a compression ratio of the detection region of the target key becomes close to 1.

9. An information processing device as set forth in claim 7, wherein:

in case where the detection region of the target key has a shape having a lengthwise dimension and a breadthwise dimension which are not equal, the detection managing section updates the positional data of the detection region so that expansion of the key display region into a vacant region located in shorter one of the lengthwise dimension and the breadthwise dimension is given priority over expansion of the key display region into a vacant region located in longer one of the lengthwise dimension and the breadthwise dimension.

10. An information processing device as set forth in claim 7, wherein:

the detection managing section acquires information of vacant regions in such a manner that (A) the detection managing section firstly acquires (i) information of a vacant region toward a first direction with respect to the key display region of the target key, and (ii) information of a vacant region toward a second direction with respect to the key display region, the second direction crossing with the first direction, and (B) if there are the vacant regions toward both the first direction and the second direction with respect to the key display region, the detection managing section further acquires (iii) information of a vacant region toward a direction between the first direction and the second direction with respect to the key display region.

11. An information processing device as set forth in claim 3, wherein:

in case where a plurality of the keys are to be displayed on the screen, the operation managing section gives, to the detection managing section, information regarding priority order for the keys; and the detection managing section updates positional data of detection regions of the keys in accordance with the priority order.

12. An information processing device as set forth in claim 3, wherein:

in case where a plurality of the keys are to be displayed on the screen, the detection managing section calculates out a distance between the keys, from a size of the screen and that key arrangement on the screen which the detection managing section determine and updates positional data of the detection region on the screen so that the extent of the detection region are in accordance with the distance thus calculated out.

13. An information processing device as set forth in claim 3, comprising:

a display managing section for determining display status of the key on the screen, the display managing section expanding the detection region of the key in accordance with expansion of the extent of the detection region by the detection managing section.

14. An information processing device as set forth in claim 3, comprising:

a display managing section for determining display status of the key on the screen, in case where, as a result of a change in an operation state of the information processing device, the operation managing section determines to increase a number of the keys to be displayed on the screen so that the number of the keys becomes greater after the change in the operation state than before, and in case where key display regions of the keys have a shape having a lengthwise dimension and a breadthwise dimension which are not equal, the display managing section determines the display status so as to increase a number of those ones of the keys which are arranged along a direction associated with longer one of the lengthwise dimension and breadthwise dimension.

15. An image outputting device, comprising:

an information processing device for processing information, the information processing device comprising a screen for displaying at least one key that is selectable by touching the screen or locally approaching the screen, and a detection within in which selecting of the key is detectable, the information processing device comprising:

an operation managing section for determining a key arrangement on the screen in accordance with operation status of an apparatus to which the information processing device is provided; and a detection managing section for updating positional data of the detection region on the screen so that an extent of the detection region is adjusted in accordance with a spatical density of the key arrangement determined by the operation managing section, the image outputting device recording an image on a recording medium in accordance with an instruction outputted from the information processing device according to a key selected.

16. An information processing program for causing a computer to execute a method for processing information that defines a dimension of a detection region of a key displayed on a screen of an information processing device, where the detection region is adjacent to an invalid region, the detection region being a region in which touching of the screen in this region or local approaching to this region is detectable, and the invalid region being a region in which the touching of the screen in this region or local approaching to this region is not detectable, the method comprising:

when a distance across the invalid region from an edge of a key display region exceeds a first threshold value,
generating, by the information processing device, a detection region data that defines an extent of the detection region with respect to a dimension of the key display region so that the detection region becomes larger than the key display region by utilizing the invalid region.

17. An information processing program for causing a computer to function as an information processing device for processing information, the information processing device comprising a screen for displaying at least one key that is selectable by touching the screen or locally approaching the screen, and a detection region within which selecting of the key is detectable, the information processing device comprising:

an operation managing section for determining a key arrangement on the screen in accordance with operation status of an apparatus to which the information processing device is provided; and
a detection managing section for updating positional data of the detection region on the screen so that an extent of the detection region is adjusted in accordance with a spatical density of the key arrangement thus determined by the operation managing section.

18. A recording medium in which an information processing program is stored, the information processing program causing a computer to execute a method for processing information that defines a dimension of a detection region of a key displayed on a screen of an information processing device, where the detection region is adjacent to an invalid region, the detection region being a region in which touching of the screen in this region or local approaching to this region is detectable, and the invalid region being a region in which the touching of the screen in this region or local approaching to this region is not detectable, the method comprising:

when a distance across the invalid region from an edge of a key display region exceeds a first threshold value,
generating, by the information processing device, a detection region data that defines an extent of the detection region with respect to a dimension of the key display region so that the detection region becomes larger than the key display region by utilizing the invalid region.

19. A recording medium in which an information processing program is stored, the information processing program causing a computer to function as an information processing device for processing information, the information processing device comprising a screen for displaying at least one key that is selectable by touching the screen or locally approaching the screen, and a detection region within which selecting of the key is detectable, the information processing device comprising:

an operation managing section for determining a key arrangement on the screen in accordance with operation status of an apparatus to which the information processing device is provided; and
a detection managing section for updating positional data of the detection region on the screen so that an extent of the detection region is adjusted in accordance witha spatical density of the key arrangement determined by the operation managing section.

20. An information processing device for processing information, the information processing device comprising a screen for displaying at least one key that is selectable by touching the screen or locally approaching the screen, and a detection region in which selecting of the key is detectable, the information processing device comprising:

an operation managing section for determining key arrangement on the screen in accordance with operation status of an apparatus to which the information processing device is provided; and
a detection managing section for (i) judging whether or not a distance between a first point and a second point exceeds a first threshold value in the key arrangement determined by the operation managing section, and (ii) if the distance exceeds the first threshold, updating a positional data of the detection region so that the detection region is larger than a key display region of the key, the first point being on an edge of the key display region of the key and the second point being in a vacant region formed around the key display region of the key.

* * * * *